(12) United States Patent
Li et al.

(10) Patent No.: US 12,219,556 B2
(45) Date of Patent: Feb. 4, 2025

(54) UPLINK RESOURCE DETERMINING METHOD, UPLINK RESOURCE INDICATION METHOD, TERMINAL, AND NETWORK DEVICE

(71) Applicant: VIVO MOBILE COMMUNICATION CO., LTD., Guangdong (CN)

(72) Inventors: Na Li, Guangdong (CN); Gen Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 281 days.

(21) Appl. No.: 17/744,227

(22) Filed: May 13, 2022

(65) Prior Publication Data

US 2022/0272730 A1    Aug. 25, 2022

Related U.S. Application Data

(63) Continuation of application No. PCT/CN2020/128002, filed on Nov. 11, 2020.

(30) Foreign Application Priority Data

Nov. 14, 2019   (CN) .......................... 201911115704.2

(51) Int. Cl.
*H04W 4/00*       (2018.01)
*H04W 72/044*     (2023.01)
(Continued)

(52) U.S. Cl.
CPC ..... *H04W 72/1268* (2013.01); *H04W 72/044* (2013.01); *H04W 72/23* (2023.01); *H04W 74/0808* (2013.01)

(58) Field of Classification Search
CPC ........... H04W 72/1268; H04W 72/044; H04W 72/23; H04W 74/0808; H04W 72/0453;
(Continued)

(56) References Cited

U.S. PATENT DOCUMENTS

| 2018/0146480 A1 | 5/2018 | Chendamarai Kannan et al. |
| 2019/0132109 A1* | 5/2019 | Zhou ....................... H04L 5/001 |

(Continued)

FOREIGN PATENT DOCUMENTS

| CN | 107801246 A | 3/2018 |
| CN | 108476506 A | 8/2018 |

(Continued)

OTHER PUBLICATIONS

Extended European Search Report for Application No. 20887363. 8-1215, dated Nov. 25, 2022, 12 Pages.
(Continued)

*Primary Examiner* — Thai D Hoang
(74) *Attorney, Agent, or Firm* — BROOKS KUSHMAN P.C.

(57) ABSTRACT

An uplink resource determining method, an uplink resource indication method, a terminal, and a network device are disclosed. The method includes: receiving first DCI used to schedule transmission of a PUSCH on a target BWP, where the first DCI includes an allocation field for frequency domain resource allocation, the allocation field is determined based on a configuration of a reference BWP, and the allocation field includes first bits; and determining an uplink resource indicated by the allocation field, where the uplink resource is an uplink resource determined based on valid bits of the first bits; and a resource allocation type of at least one of the reference BWP and the target BWP is interlace resource allocation.

20 Claims, 3 Drawing Sheets

(51) Int. Cl.
*H04W 72/1268* (2023.01)
*H04W 72/23* (2023.01)
*H04W 74/0808* (2024.01)

(58) Field of Classification Search
CPC ...... H04W 72/53; H04L 5/001; H04L 5/0044; H04L 5/0053
See application file for complete search history.

(56) References Cited

U.S. PATENT DOCUMENTS

| | | | |
|---|---|---|---|
| 2019/0132845 A1* | 5/2019 | Babaei | H04L 1/1812 |
| 2019/0132857 A1* | 5/2019 | Babaei | H04W 72/23 |
| 2019/0141546 A1* | 5/2019 | Zhou | H04L 5/001 |
| 2019/0141742 A1* | 5/2019 | Zhou | H04L 5/0064 |
| 2019/0149380 A1* | 5/2019 | Babaei | H04W 72/23 370/330 |
| 2019/0313377 A1 | 10/2019 | Abdoli et al. | |
| 2019/0313412 A1 | 10/2019 | Baldemair et al. | |
| 2020/0296758 A1 | 9/2020 | Li et al. | |
| 2021/0176736 A1 | 6/2021 | Harada et al. | |
| 2022/0272730 A1* | 8/2022 | Li | H04W 72/1268 |
| 2022/0369384 A1* | 11/2022 | Sakhnini | H04W 74/0833 |

FOREIGN PATENT DOCUMENTS

| | | | | |
|---|---|---|---|---|
| CN | 109586878 A | 4/2019 | | |
| CN | 109983827 A | 7/2019 | | |
| CN | 109995497 A | 7/2019 | | |
| WO | 2017165811 A1 | 9/2017 | | |
| WO | WO-2018232284 A1 * | 12/2018 | ........ | H04W 72/0457 |
| WO | 2019050379 A1 | 3/2019 | | |
| WO | WO-2019084570 A1 * | 5/2019 | ........... | H04B 17/318 |

OTHER PUBLICATIONS

MCC Support, "Final Report of 3GPP TSG RAN WG1 #98 v2.0.0 (Prague, Czech Rep, Aug. 26-30, 2019)," 3GPP TSG RAN WG1 Meeting #98bis, Oct. 14-18, 2019, R1-1911429, Chongqing, China, 180 Pages.
Ericsson, "UL Signals and Channels for NR-U," 3GPP TSG-RAN WG1 Meeting #99, Agenda item 7.2.2.1.3, Nov. 18-22, 2019, R1-1912708, Reno, Nevada, USA, 24 Pages.
First Office Action for Japanese Application No. 2022-526339, dated Apr. 19, 2023, 5 Pages.
3GPP Organizational Partners "3rd Generation Partnership Project; Technical Specification Group Radio Access Network; NR; Physical layer procedures for control" France, 3GPP TS 38.213 V15.7.0, Sep. 2019, 108 Pages.
Nokia, Nokia Shanghai Bell "Remaining details on NR-U uplink signals and channels" 3GPP TSG RAN WG1 #99, Reno, USA, Nov. 2019, R1-1912259, 16 Pages.
Samsung "Uplink signal and channel design for NR-U" 3GPP TSG-RAN WG1 Meeting #99, Reno, USA, Nov. 2019, R1-1912448, 7 Pages.
First Office Action for Chinese Application No. 201911115704.2, dated Mar. 3, 2022, 8 Pages.
International Search Report and Written Opinion for Application No. PCT/CN2020/128002, dated Jan. 28, 2021, 9 Pages.
CATT, "On PDSCH and PUSCH Resource Allocation," 3GPP TSG RAN WG1 #1, Agenda item 7.3.3.1, Nov. 27-Dec. 1, 2017, R1-1721416, Reno, NV, USA, 18 Pages.
Qualcomm Incorporated, "Remaining Issues on BWP," 3GPP TSG RAN WG1 Meeting AH 1801, Agenda item 7.3.4.1, Jan. 22-26, 2018, R1-1800879, Vancouver, Canada, 13 Pages.
Samsung, "DCI Contents and Formats," 3GPP TSG RAN WG1 #93, Agenda item 7.1.3.1.4, May 21-25, 2018, R1-1806731, Busan, Korea, 4 Pages.
Charter Communications, "UL BWP Management in NR-U," 3GPP TSG RAN WG1 #94BIS, Agenda item 7.2.2.4.4, Oct. 8-12, 2018, R1-1811320, Chengdu, P.R. China, 3 Pages.
First Office Action in KR Application No. 10-2022-7019718 dated Nov. 27, 2024 (11 pages, including English translation).
Ericsson, UL Signals and Channels for NR-U, Apr. 2019, 9 pages, R1-1904334, Xi'an, China.
UL Signals and Channels for NR-U Operation, MediaTek Inc., Nov. 2019, 10 pages, R1-1912087, Reno, USA.

* cited by examiner

UPLINK RESOURCE DETERMINING METHOD, UPLINK RESOURCE INDICATION METHOD, TERMINAL, AND NETWORK DEVICE

CROSS-REFERENCE TO RELATED APPLICATIONS

This application is a continuation of International Application No. PCT/CN2020/128002 filed on Nov. 11, 2020, which claims priority to Chinese Patent Application No. 201911115704.2, filed on Nov. 14, 2019, which are incorporated herein by reference in their entireties.

TECHNICAL FIELD

The present disclosure relates to the field of communications technologies, and in particular, to an uplink resource determining method, an uplink resource indication method, a terminal, and a network device.

BACKGROUND

In some communications systems (for example, a 5G system), transmission of a physical uplink shared channel (PUSCH) on a bandwidth part (BWP) is mainly scheduled by using downlink control information (DCI). Specifically, an uplink frequency domain resource may be indicated by using a frequency domain resource allocation (FDRA) field in the DCI. However, currently, the frequency domain resource allocation field in the DCI is related to a configuration of the BWP, but the BWP on which the PUSCH scheduled by using the DCI is located may be different from a BWP for determining the frequency domain resource allocation field in the DCI, for example, parameters of the BWPs are different. In this case, the frequency domain resource allocation field in the DCI may not match a frequency domain resource of the BWP scheduled by using the DCI, and therefore a terminal cannot determine an uplink resource indicated by the DCI, resulting in relatively low transmission performance of the terminal.

SUMMARY

Embodiments of the present disclosure provide an uplink resource determining method, an uplink resource indication method, a terminal, and a network device, to resolve a problem that transmission performance of a terminal is relatively low because the terminal cannot determine an uplink resource indicated by DCI.

According to a first aspect, an embodiment of the present disclosure provides an uplink resource determining method, applied to a terminal and including:

receiving first downlink control information DCI used to schedule transmission of a physical uplink shared channel PUSCH on a target bandwidth part BWP, where the first DCI includes an allocation field for frequency domain resource allocation, the allocation field is determined based on a configuration of a reference BWP, and the allocation field includes first bits; and determining an uplink resource indicated by the allocation field, where the uplink resource is an uplink resource determined based on valid bits of the first bits; and a resource allocation type of at least one of the reference BWP and the target BWP is interlace resource allocation.

According to a second aspect, an embodiment of the present disclosure provides an uplink resource indication method, applied to a network device and including:

sending first downlink control information DCI used to schedule transmission of a physical uplink shared channel PUSCH on a target bandwidth part BWP, where the first DCI includes an allocation field for frequency domain resource allocation, the allocation field is determined based on a configuration of a reference BWP, and the allocation field includes first bits; and the allocation field indicates that an uplink resource is indicated by using valid bits of the first bits; and a resource allocation type of at least one of the reference BWP and the target BWP is interlace resource allocation.

According to a third aspect, an embodiment of the present disclosure provides a terminal, including:

a receiving module, configured to receive first downlink control information DCI used to schedule transmission of a physical uplink shared channel PUSCH on a target bandwidth part BWP, where the first DCI includes an allocation field for frequency domain resource allocation, the allocation field is determined based on a configuration of a reference BWP, and the allocation field includes first bits; and a determining module, configured to determine an uplink resource indicated by the allocation field, where the uplink resource is an uplink resource determined based on valid bits of the first bits; and a resource allocation type of at least one of the reference BWP and the target BWP is interlace resource allocation.

According to a fourth aspect, an embodiment of the present disclosure provides a network device, including:

a sending module, configured to send first downlink control information DCI used to schedule transmission of a physical uplink shared channel PUSCH on a target bandwidth part BWP, where the first DCI includes an allocation field for frequency domain resource allocation, the allocation field is determined based on a configuration of a reference BWP, and the allocation field includes first bits; and the allocation field indicates that an uplink resource is indicated by using valid bits of the first bits; and a resource allocation type of at least one of the reference BWP and the target BWP is interlace resource allocation.

According to a fifth aspect, an embodiment of the present disclosure provides a terminal, including a memory, a processor, and a program that is stored in the memory and that can be run on the processor, where when the program is executed by the processor, the steps of the uplink resource determining method provided in the embodiments of the present disclosure are implemented.

According to a sixth aspect, an embodiment of the present disclosure provides a network device, including a memory, a processor, and a program that is stored in the memory and that can be run on the processor, where when the program is executed by the processor, the steps of the uplink resource indication method provided in the embodiments of the present disclosure are implemented.

According to a seventh aspect, an embodiment of the present disclosure provides a computer-readable storage medium, where the computer-readable storage medium stores a computer program, and when the computer program is executed by a processor, the steps of the uplink resource determining method provided in the embodiments of the present disclosure are implemented, or when the computer program is executed by a processor, the steps of the uplink resource indication method provided in the embodiments of the present disclosure are implemented.

In the embodiments of the present disclosure, first downlink control information DCI used to schedule transmission of a physical uplink shared channel PUSCH on a target bandwidth part BWP is received, where the first DCI includes an allocation field for frequency domain resource allocation, the allocation field is determined based on a configuration of a reference BWP, and the allocation field includes first bits; and an uplink resource indicated by the allocation field is determined, where the uplink resource is an uplink resource determined based on valid bits of the first bits; and a resource allocation type of at least one of the reference BWP and the target BWP is interlace resource allocation. In this way, the uplink resource indicated by the DCI may be determined based on the valid bits of the first bits, thereby improving transmission performance of a terminal.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, in the specification and claims, "and/or" is used to indicate at least one of connected objects. For example, A and/or B represents the following three cases: Only A is included, only B is included, and both A and B exist.

In the embodiments of the present disclosure, the word such as "example" or "for example" is used to represent giving an example, an illustration, or a description. Any embodiment or design scheme described as an "example" or "for example" in the embodiments of the present disclosure should not be explained as being more preferred or having more advantages than another embodiment or design scheme. Exactly, use of the term "example" or "for example" is intended to present a concept in a specific manner.

The embodiments of the present disclosure are described below with reference to the accompanying drawings. An uplink resource determining method, an uplink resource indication method, a terminal, and a network device provided in the embodiments of the present disclosure may be applied to a wireless communications system. The wireless communications system may be a new radio (NR) system or another system such as an evolved Long Term Evolution (eLTE) system, a Long Term Evolution (LTE) system, or a subsequent evolved communications system. Further, the uplink resource determining method, the uplink resource indication method, the terminal, and the network device may be applied to an unlicensed band in the foregoing wireless communications system.

Figure 1:
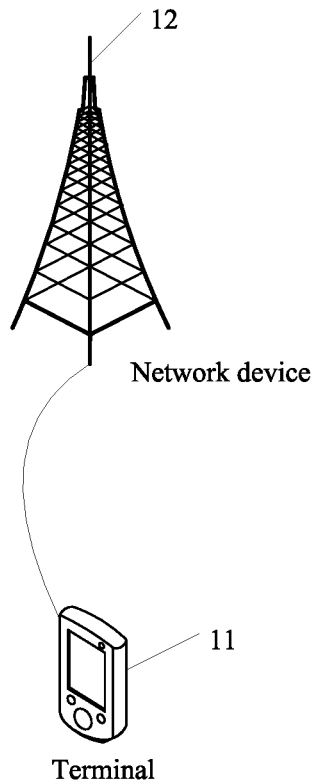
FIG. 1 is a structural diagram of a network system to which the embodiments of the present disclosure can be applied.

Referring to FIG. 1, FIG. 1 is a structural diagram of a network system to which the embodiments of the present disclosure can be applied. As shown in FIG. 1, the network system includes a terminal 11 and a network device 12. The terminal 11 may be user equipment (UE) or another terminal side device, for example, a mobile phone, a tablet personal computer, a laptop computer, a personal digital assistant (PDA), a mobile internet device (MID), a wearable device, or a robot. It should be noted that a specific type of the terminal 11 is not limited in the embodiments of the present disclosure. The network device 12 may be a 4G base station, a 5G base station, or a base station of a later release, or a base station in another communications system, or may be referred to as a NodeB, an evolved NodeB, or a transmission reception point (TRP), or an access point (AP), or another term in the field. Provided that a same technical effect is achieved, the network device is not limited to a specific technical term. In addition, the network device 12 may be a master node (MN) or a secondary node (SN). It should be noted that, in the embodiments of the present disclosure, only a 5G base station is used as an example, but a specific type of the network device is not limited.

Figure 2:
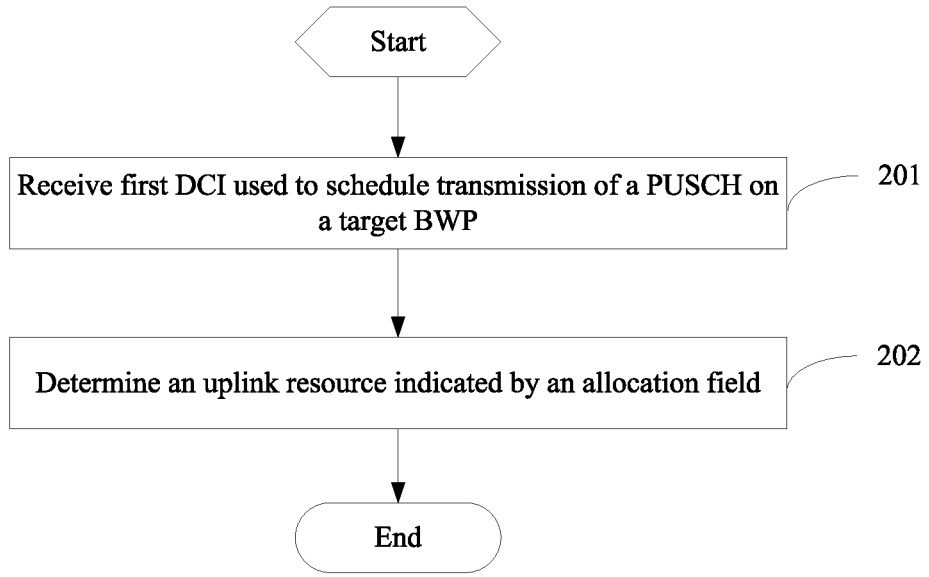
FIG. 2 is a flowchart of an uplink resource determining method according to an embodiment of the present disclosure.

Referring to FIG. 2, FIG. 2 is a flowchart of an uplink resource determining method according to an embodiment of the present disclosure. The method is applied to a terminal. As shown in FIG. 2, the method includes the following steps.

Step 201: Receive first DCI used to schedule transmission of a PUSCH on a target BWP, where the first DCI includes an allocation field for frequency domain resource allocation, the allocation field is determined based on a configuration of a reference BWP, and the allocation field includes first bits; and a resource allocation type of at least one of the reference BWP and the target BWP is interlace resource allocation.

The target BWP may be a BWP on which the PUSCH is transmitted, and may be specifically an initial uplink BWP (initial UL BWP) or an active uplink BWP (active ULB WP). In addition, the reference BWP and the target BWP may be the same or different.

The first DCI may be DCI received in a common search space (CSS) or a UE-specific search space (USS). In addition, the first DCI may be fallback DCI, for example, DCI Format 0_0; or the first DCI may be non-fallback DCI indicating switching of a BWP and scheduling transmission of the PUSCH on the target BWP after the switching, for example, DCI Format 0_1.

The allocation field may be a frequency domain resource allocation (FDRA) field, or certainly, may be another field used to indicate frequency domain resource allocation. This is not limited.

That the allocation field is determined based on a configuration of a reference BWP may be: a size Nr of a field used for frequency domain resource allocation in the DCI is determined based on the configuration of the reference BWP (for example, at least one of a bandwidth, a frequency domain resource allocation type, and a subcarrier spacing). The size Nr may also be referred to as the number of bits. It should be noted that a manner of determining the size of field used for frequency domain resource allocation is not limited in this embodiment of the present disclosure. For example, a manner defined in a protocol or newly defined in a subsequent protocol release may be used.

In this embodiment of the present disclosure, the allocation field may include but is not limited to at least one of the following:

a physical/virtual resource block (PRB/VRB) allocation indication, an interlace allocation indication, and a listen before talk (LBT) bandwidth indication.

The PRB/VRB allocation indication may be a PRB bitmap indication, a virtual resource block (VRB) bitmap indication, or a resource indication value (RIV) allocation indication.

For example, for a resource allocation type 0 (Uplink resource allocation type 0), the allocation field is a resource block group (RBG) bitmap indication, where one RBG includes a plurality of contiguous VRBs, and a size of the allocation field is Nr. For a resource allocation type 1 (uplink resource allocation type 1), the allocation field is an RIV allocation indication that is used to indicate one or more contiguous non-interleaved VRBs (a set of contiguously allocated non-interleaved virtual resource blocks), and a size of the allocation field is Nr. For another example, for interlace resource allocation (or referred to as an uplink resource allocation type 2), the allocation field may include an interlace allocation indication, and may further include an LBT bandwidth indication, a size of the interlace allocation indication size is Nr1, a size of the LBT bandwidth indication size is Nr2, and Nr2=BWP bandwidth or LBT bandwidth size, where Nr=Nr1+Nr2. The interlace allocation indication and the LBT bandwidth indication may be in a bit field (for example, FDRA) in DCI, or may be in different number of bits.

It should be noted that, in this embodiment of the present disclosure, the LBT bandwidth indication may be used to indicate an allocated LBT bandwidth, or may be used to indicate a resource block (RB) set. For example, an RB set list (each element in the list may represent an LBT bandwidth combination or a plurality of RB combinations) is configured in RRC, and then a to-be-scheduled RB set is indicated. If the RB set list is not configured in the RRC or there is only one element in the list, an RB set does not need to be indicated in the DCI. Otherwise, the number of bits for indicating an RB combination in the DCI depends on the number of configured RB sets.

It should be noted that in this embodiment of the present disclosure, a size may also be referred to as the number of bits.

In addition, in this embodiment of the present disclosure, three resource allocation types: the interlace resource allocation, the resource allocation type 0, and the resource allocation type 1 may be resource allocation types defined in a protocol or newly introduced resource allocation types in a subsequent protocol.

Step 202: Determine an uplink resource indicated by the allocation field, where the uplink resource is an uplink resource determined based on valid bits of the first bits.

The valid bits of the first bits may be all or a part of bits of the first bits, or may be bits obtained by dividing all or a part of the first bits. This may be specifically determined based on an actual situation. For example, the BWP includes 10 interlace, but the first bits include 15 bits, so that 10 bits of the 15 bits (for example, most significant bits MSBs or least significant bits LSBs) can be used as the foregoing valid bits, to determine a resource indicated by the 10 bits in the 10 interlace.

In this embodiment of the present disclosure, in the foregoing step, an uplink resource indicated by DCI may be determined in a case that a field used for frequency domain resource allocation does not match a frequency domain resource of a BWP in which a PUSCH scheduled by the DCI is located, thereby improving transmission performance.

In an optional implementation, the uplink resource includes:

an uplink resource indicated by the valid bits in some resources of the target BWP; or an uplink resource indicated by the valid bits at a scaled granularity; or a predefined uplink resource in resources of the target BWP.

That the uplink resource is indicated by the valid bits in some resources of the target BWP may be: indication is performed by the valid bits only in some resources of the target BWP, rather than all resources of the target BWP. For example, if the target BWP includes 10 interlace, and the valid bits are only 5 bits, a resource may be indicated only in five interlace. In this way, an error caused by determining an uplink resource in a resource indication manner of indicating all resources of the target BWP can be avoided. For example, the allocation field includes only 5 interlace indication bits, that is, the allocation field does not match the frequency domain resource of the target BWP. If a resource is indicated in the 10 interlace based on 5 bits, the terminal cannot determine the resource indicated by the 5 bits. However, in this embodiment of the present invention, because indication is performed by the valid bits only in some resources of the target BWP, for example, a resource is indicated in five interlace (for example, five interlace with a minimum interlace index), the terminal can accurately determine the resource indicated by the 5 bits.

That the uplink resource is indicated by the valid bits at the scaled granularity may be: a granularity for indicating a resource by the valid bits is a granularity obtained by scaling a reference granularity (or a default granularity). For example, a granularity is increased, or a resource indication granularity is set to a granularity greater than one resource unit. In this way, in a case that the allocation field does not match the frequency domain resource of the target BWP, an indication of the allocation field may be determined at the scaled granularity. For example, the allocation field includes only 5 interlace indication bits, and the target BWP includes 10 interlace, that is, the allocation field does not match the frequency domain resource of the target BWP. If a resource indication manner with a granularity of 1 is used, the terminal cannot determine a resource indicated by the 5 bits. However, in this embodiment of the present disclosure, because the granularity for indicating the resource by the valid bits is a scaled granularity (for example, the granularity is 2, that is, each bit indicates two adjacent interlace), the resource can be accurately indicated by the 5 bits.

That the predefined uplink resource in the resources of the target BWP may be an uplink resource specified in advance in a protocol, a resource specified in advance by a network device to the terminal, a resource determined by the terminal according to a predefined rule, or the like.

It should be noted that indicating the uplink resource by the valid bits in some resources of the target BWP, indicating the uplink resource by the valid bits at the scaled granularity, and predefining the uplink resource in the resources of the target BWP may be referred to as a first resource indication manner. In this embodiment of the present disclosure, the uplink resource may be indicated by the valid bits in a second resource indication manner. The second resource indication manner is as follows: The valid bits indicate an uplink resource in all resources of the target BWP, or the valid bits indicate an uplink resource at a granularity that is not scaled. Specifically, the granularity in the first resource indication manner (that is, the scaled granularity) is greater than the granularity in the second resource indication manner, or the granularity in the first resource indication manner is increased (or amplified) based on the granularity in the second resource indication manner. In addition, the second resource indication manner may be a default resource indication manner in a protocol.

In an optional implementation, the valid bits are all or a part of the first bits.

The valid bits are all bits of the first bits, and the valid bits may indicate the uplink resource in the first resource indication manner or the second resource indication manner, that is, the valid bits indicate the uplink resource in some resources of the target BWP, or the valid bits indicate the uplink resource at the scaled granularity.

That the valid bits are a part of the first bits and may be: the valid bits are bits selected or truncated from the first bits, for example, a part of most significant bits (MSB) or a part of least significant bits (LSB). When the valid bits are a part of the first bits, the valid bits may indicate the uplink resource in the second resource indication manner, that is, the valid bits indicate the uplink resource in all resources of the target BWP, or the valid bits indicate the uplink resource at the granularity that is not scaled. Certainly, the valid bits may also indicate the uplink resource in the first resource indication manner. This is not limited.

In an optional implementation, the valid bits are M pieces of bit content obtained by dividing all or a part of the first bits, where the M pieces of bit content are M resource indications, and M is an integer greater than or equal to 1.

That the valid bits are M pieces of bit content obtained by dividing a part of the first bits may be: the valid bits are M pieces of bit content obtained by truncating or selecting a part of the first bits and then dividing the part of bits.

In addition, the M pieces of bit content obtained by dividing the first bits may be M pieces of bit content obtained by re-dividing the first bits. In a case that M is equal to 1, the first bits may include a plurality of pieces of bit content (for example, interlace indication bits and LBT bandwidth indication bits). In this implementation, the plurality of pieces of bit content are divided into one piece of bit content (for example, an interlace indication bit, an RBG indication bit, or a VRB RIV indication bit (an RIV used to indicate contiguously allocated VRBs)).

Certainly, dividing the first bits into the M pieces of bit content may also be directly dividing the first bits into the M pieces of bit content, for example, dividing the first bits into interlace indication bits and LBT bandwidth indication bits.

In addition, the number of pieces of bit content included in the first bits before the division may be the same as or different from the number of pieces of bit content obtained after the division. For example, the first bits include VRB RIV indication bits before the division, and the valid bits include interlace indication bits and LBT bandwidth indication bits after the division. For another example, the first bits include interlace indication bits and LBT bandwidth indication bits before the division, and the valid bits include only RIV indication bits or interlace indication bits after the division, the first bits include interlace indication bits before the division, and the valid bits include interlace indication bits and LBT bandwidth indication bits after the division. For another example, the first bits include interlace indication bits and LBT bandwidth indication bits before the division, and the valid bits include interlace indication bits and LBT bandwidth indication bits after the division. However, the number of bits included in the interlace indication bits and the LBT bandwidth indication bits before and after the division is different.

In this implementation, the valid bits are M pieces of bit content obtained by dividing the first bits. In this way, when the allocation field does not match the frequency domain resource of the target BWP, the terminal can effectively determine the uplink resource indicated by the first DCI.

In an optional implementation, the number of bits of the first bits is the number of bits obtained by performing bit truncation on bits of the allocation field determined based on the configuration of the reference BWP during DCI size alignment.

For example, the number of bits in the allocation field determined based on the configuration of the reference BWP is Nr, and the number of bits obtained through truncation may be Nr' (Nr'<Nr). For example, if bit truncation is not performed on the bits of the allocation field determined based on the configuration of the reference BWP, the first bits are the number Nr of bits of the allocation field determined based on the configuration of the reference BWP; if bit truncation is performed on the bits of the allocation field determined based on the configuration of the reference BWP, the first bits are the number Nr' of bits obtained by performing bit truncation on the bits of the allocation field determined based on the configuration of the reference BWP.

For example, for the resource allocation type 0/1, the allocation field is an RBG bitmap indication or an RIV allocation indication, and the size of the field is Nr'.

For the interlace resource allocation, the allocation field includes an interlace allocation indication with a size Nr1' and an LBT bandwidth indication with a size Nr2', where Nr'=Nr1'+Nr2'.

In this implementation, the number of bits of the first bits is the number of bits obtained by performing bit truncation on the bits of the allocation field determined based on the configuration of the reference BWP during DCI size alignment. Therefore, even if DCI size alignment is performed, it can be ensured that the terminal determines the uplink resource based on the truncated bits. In addition, DCI size alignment may be performed by the network device, or may be performed by the terminal. This is not limited herein.

Optionally, the number of bits obtained by performing bit truncation on the bits of the allocation field determined based on the configuration of the reference BWP during DCI size alignment includes:

the number of bits obtained by performing bit truncation on interlace indication bits of the allocation field determined based on the configuration of the reference BWP; or the number of bits obtained by performing bit truncation on listen before talk LBT bandwidth indication bits of the allocation field determined based on the configuration of the reference BWP; or the number of bits obtained by performing bit truncation on interlace indication bits and LBT bandwidth indication bits of the allocation field determined based on the configuration of the reference BWP.

For example, the reference BWP is the same as the target BWP, for example, a size of DCI 0_0 in a CSS is aligned with that of DCI 1_0 in the CSS, and the reference BWP and the target BWP are initial BWPs, or DCI 0_0 in a USS is aligned with DCI 1_0 in the USS, and the reference BWP and the target BWP are initial BWPs or active BWPs. In this way, when frequency domain allocation types of both the reference BWP and the target BWP are interlace resource allocation, and size alignment is performed on a frequency domain allocation field in DCI to change to Nr', (Nr−Nr') bits are truncated in the following manner:

If there is only an interlace indication (bandwidths of the reference BWP and the target BWP are less than or equal to one LBT bandwidth, or only one RB set is configured), (Nr−Nr') bits are truncated in interlace indication bits.

If there is an interlace indication and an LBT bandwidth indication (bandwidths of the reference BWP and the target BWP are greater than one LBT bandwidth, or a plurality of RB sets are configured), the following three manners are available:

Manner 1: (Nr−Nr') bits are truncated in only the interlace indication.

Manner 2: (Nr−Nr') bits are truncated in only the LBT bandwidth indication.

Manner 3: A total of (Nr−Nr') bits are truncated in the interlace indication and the LBT bandwidth indication. For example, LBT bandwidth indication bits are truncated first and then interlace indication bits are truncated until (Nr−Nr') bits are truncated, or interlace indication bits and then LBT bandwidth indication bits are truncated until (Nr−Nr') bits are truncated, or (Nr−Nr') bits are truncated from LBT bandwidth indication bits and interlace indication bits according to a specific ratio.

In this implementation, truncation can be flexibly performed on the allocation field based on an actual requirement. Certainly, in this embodiment of the present disclosure, the truncation manner is not limited. For example, the number of bits may be obtained by performing bit truncation on RIV or RBG allocation indication bits of the allocation field determined based on the configuration of the reference BWP.

Optionally, if bit truncation is performed on the interlace indication bits, interlace included in the uplink resource is interlace indicated by interlace indication bits in the valid bits in some interlace of the target BWP, or interlace indicated by interlace indication bits in the valid bits at an amplified granularity; or if bit truncation is performed on the LBT bandwidth indication bits, an LBT bandwidth included in the uplink resource is LBT bandwidth indicated by LBT bandwidth indication bits in the valid bits in some LBT bandwidths of the target BWP, or an LBT bandwidth indicated by LBT bandwidth indication bits in the valid bits at an amplified granularity, or a predefined LBT bandwidth of the target BWP.

In this implementation, if the interlace indication bits are truncated, the interlace may be the interlace indicated in some interlace or indicated at the amplified granularity. If the LBT bandwidth indication bits are truncated, the LBT bandwidth may be the LBT bandwidth indicated in some LBT bandwidths or indicated at the amplified granularity.

In addition, that the LBT bandwidth included in the uplink resource is the predefined LBT bandwidth of the target BWP may be: in a case that all or a part of the LBT bandwidth indication bits are truncate, the terminal may determine that the LBT bandwidth indicated by the allocation field is the predefined LBT bandwidth, where the predefined LBT bandwidth herein may be stipulated in a protocol, indicated by the network device in advance, or preconfigured by the terminal. Specifically, the LBT bandwidth may be a specific LBT bandwidth or all LBT bandwidths on the target BWP, such as an LBT bandwidth with a minimum or maximum index, or an LBT bandwidth on which DCI transmission is performed or an initial BWP is located. In this implementation, the uplink resource allocated to the PUSCH on the target BWP may be determined when there is no LBT bandwidth indication bit in the allocation field or the LBT bandwidth is truncated as 0 or 1.

For example, if the interlace indication bits are truncated, the interlace indicated by the allocation field may be determined in the following manner:

Manner 1: Some interlace is indicated, that is, indication is performed in some interlace of the target BWP.

Manner 2: Interlace granularity scaling is performed, that is, a granularity for indicating a resource is a scaled granularity, where the scaled granularity (or referred to as a scaling factor) may be a fixed value or may be obtained through calculation by using Nr and Nr', for example, $\lceil Nr/Nr' \rceil$ or $\lfloor Nr/Nr' \rfloor$. Optionally, if the first DCI is received in a USS, the manner 2 may be used; or if the first DCI is received in a CSS, the manner 1 may be used.

If the LBT bandwidth indication bits are truncated, the following manner may be used:

Manner 1: Some LBT bandwidths are indicated, that is, indication is performed in some LBT bandwidths of the target BWP. Further, if all bits of the LBT bandwidth are truncated, a specific LBT bandwidth is indicated; if a scheduled BWP includes an initial BWP, the initial BWP is indicated; otherwise, a predefined LBT bandwidth is indicated, such as all LBT bandwidths with a minimum or maximum index.

Manner 2: A granularity for LBT bandwidth indication is increased, that is, a granularity for indicating a resource is a scaled granularity, where the scaled granularity (or referred to as a scaling factor) is a fixed value or is obtained through calculation by using Nr and Nr', for example, Nr/Nr', or is determined based on configurations of the target BWP and the reference BWP (for example, bandwidths or RB sets), for example, rounding up $Nr^{LBTbandwidth}/Nd^{LBTbandwidth}$, where $Nr^{LBTbandwidth}$ represents the number of LBT bandwidths included in the configuration of the reference BWP, and $Nd^{LBTbandwidth}$ represents the number of LBT bandwidths included in the configuration of the target BWP.

Optionally, if the first DCI is fallback DCI 0_0 received in a USS, the manner 2 may be used. If the first DCI is fallback DCI 0_0 received in a CSS, the manner 1 may be used.

In an optional implementation, the determining an uplink resource indicated by the allocation field includes:

determining, based on a configuration of the target BWP, the number of bits required by the field for frequency domain resource allocation in the DCI used to schedule transmission of the PUSCH on the target BWP; and determining, based on the number of required bits, the uplink resource indicated by the allocation field.

The configuration of the target BWP may be a configuration parameter such as a bandwidth, a frequency domain resource allocation type, or a subcarrier spacing. In this embodiment of the present disclosure, a manner of determining the number of required bits is not limited. For example, a manner defined in a protocol or a manner newly defined in a subsequent protocol release may be used.

In this embodiment of the present disclosure, the number of required bits, that is, the number of indication bits for frequency domain resource allocation that is determined based on the configuration of the target BWP, is denoted by Nd for ease of description.

For example, for the resource allocation type 0/1, the resource allocation field is an RBG bitmap indication or an RIV allocation indication, and a size of the field is Nd.

For the interlace resource allocation, the resource allocation field includes interlace indication bits and LBT bandwidth indication bits, where the number of bits required by the interlace indication bits is Nd1, and the number of bits required by the LBT bandwidth indication bits is Nd2, where Nd=Nd1+Nd2. There may be no LBT bandwidth indication bit, that is, Nd2=0.

The determining, based on the number of required bits, the uplink resource indicated by the allocation field may be determining the valid bits based on the number of required bits, or determining a resource indication manner of the valid bits.

Because the uplink resource indicated by the allocation field is determined based on the number of required bits, the uplink resource indicated by the allocation field can be more accurately determined.

In this implementation, the first bits may be compared with the number of required bits as a whole. For example, if the number of bits of the first bits is greater than or equal to the number of required bits, and the number of bits of the valid bits is equal to the number of required bits; or if the number of bits of the first bits is less than the number of required bits, the uplink resource is the uplink resource indicated by the valid bits in some resources of the target BWP, or the uplink resource indicated by the valid bits at the scaled granularity, or the predefined uplink resource in the resources of the target BWP.

That the number of bits of the valid bits is equal to the number of required bits may be: bits corresponding to the number of required bits are selected from the first bits as the valid bits, or when the number of bits of the first bits is equal to the number of required bits, the first bits are used as the valid bits. In this case, the valid bits may be M pieces of bit content obtained by dividing the first bits. In addition, the valid bits may indicate the uplink resource in the first resource indication manner or the second resource indication manner.

When the number of bits of the first bits is less than the number of required bits, the valid bits may be the first bits, or may be M pieces of bit content obtained by dividing the first bits.

Optionally, the interlace indication bits and/or the LBT bandwidth indication bits included in the valid bits are obtained by dividing all or a part of the first bits, where the first bits include interlace indication bits and/or LBT bandwidth indication bits.

For example, the first bits include interlace indication bits and LBT bandwidth indication bits, and the valid bits may include interlace indication bits and/or T bandwidth indication bits after the first bits are re-divided; or the first bits include interlace indication bits or LBT bandwidth indication bits, and the valid bits may be interlace indication bits and/or LBT bandwidth indication bits after the first bits are re-divided.

In this implementation, the valid bits can be flexibly divided based on an actual requirement.

Optionally, in a case that the number of bits of the first bits is less than the number of required bits:

if the first bits include interlace indication bits and/or LBT bandwidth indication bits, the number of interlace indication bits is less than or equal to the number of bits required by interlace indication bits in the number of required bits, and/or the number of LBT bandwidth indication bits is less than or equal to the number of bits required by LBT bandwidth indication bits in the number of required bits.

In this implementation, the interlace indication bits and/or the LBT bandwidth indication bits can be flexibly configured or selected.

Optionally, if the number of interlace indication bits of the first bits is less than the number of bits required by the interlace indication bits in the number of required bits, the interlace included in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

In this implementation, in a case that the number of LBT bandwidth bits of the first bits is less than the number of bits required by the LBT bandwidth indication bits in the number of required bits, the LBT bandwidth indicated by the allocation field can be determined in the first resource indication manner, and in a case that the number of LBT bandwidth indication bits of the first bits is less than the number of bits required by the LBT bandwidth indication bits in the number of required bits, the LBT bandwidth indicated by the allocation field can be determined in the first resource indication manner.

The following uses an example in which the first bits are bits that are not truncated for description:

When the reference BWP and the target BWP are different, a frequency domain allocation field in DCI is not adjusted during DCI size alignment.

If a frequency domain resource allocation type of the reference BWP is interlace resource allocation, and a frequency domain resource allocation type of the target BWP is interlace resource allocation, Nr=Nr1+Nr2, and Nd=Nd1+Nd2.

The total numbers of bits of Nr and Nd are compared and redefinition is performed based on the total numbers of bits. Details are as follows:

If Nr>=Nd, Nd bits are selected for indication, for example, Nd most significant bits or least significant bits, where Nd1 bits indicate interlace allocation, and Nd2 bits indicate an LBT bandwidth.

If Nr<Nd, Nd1'<=Nd1 bits in Nr bits indicate interlace allocation, Nd2'<=Nd2 bits indicate an LBT bandwidth, and Nd1'+Nd2'=Nr. Details are as follows:

Interlace indication is preferentially ensured, that is, Nd1'=Nd1, and Nd2'=Nr−Nd1'; or LBT bandwidth indication is preferentially ensured, that is, Nd2'=Nd2, and Nd1'=Nr−Nd2'; or Nd1' and Nd2' are selected according to a ratio or a predefined rule.

If Nd1'<Nd1, the following manner may be used:

Manner 1: Zero padding is performed on missing (Nd1−Ndr) bits to indicate some interlace, that is, the interlace is the interlace indicated by the interlace indication bits in the valid bits in some interlace of the target BWP.

Manner 2: Interlace granularity scaling is performed, that is, a granularity for indicating a resource is a scaled granularity, where the scaled granularity (or referred to as a scaling factor) is a fixed value or is obtained through calculation by using Nd1' and Nd1, for example, Nd1'/Nd1.

Optionally, if the first DCI is fallback DCI 0_0 received in a USS, the manner 2 may be used. If the first DCI is fallback DCI 0_0 received in a CSS, the manner 1 may be used.

If Nd2'<Nd2, the following manner may be used:

Manner 1: Zero padding is performed on missing (Nd2−Nd2') bits to indicate some LBT bandwidths, that is, the LBT bandwidth indicated by the LBT bandwidth indication bits in the valid bits in some LBT bandwidths of the target BWP.

Further, if Nd2'=0, the predefined LBT bandwidth is indicated, that is, the LBT bandwidth included in the uplink resource is the predefined LBT bandwidth of the target BWP. For example, if a scheduled BWP includes an initial BWP, the initial BWP is indicated; otherwise, all LBT bandwidths with a minimum or maximum index or LBT bandwidths that are the same as LBT bandwidths in which DCI is located are indicated.

If Nd2'=1, the predefined LBT bandwidth is indicated, or a rule is defined to represent LBT bandwidths separately indicated by '0' and '1'.

Manner 2: A granularity for LBT bandwidth indication is increased, that is, a granularity for indicating a resource is a scaled granularity, where the scaled granularity (scaling factor) is a fixed value or is obtained through calculation by using Nd2' and Nd2, for example, ceil(Nd2'/Nd2) or floor (Nd2'/Nd2).

Optionally, if the first DCI is fallback DCI 0_0 received in a USS, the manner 2 may be used. If the first DCI is fallback DCI 0_0 received in a CSS, the manner 1 may be used.

In addition, the foregoing implementation of determining, based on the number of required bits, the uplink resource indicated by the allocation field may also be separately comparing each part of the first bits with each part of the number of required bits. For example, if the number of interlace indication bits of the first bits is greater than or equal to the number of bits required by interlace indication bits in the number of required bits, the interlace in the uplink resource is the interlace indicated by the interlace indication bits in the valid bits, where the number of bits of interlace indication bits in the valid bits is equal to the number of bits required by the interlace indication bits; or if the number of LBT bandwidth indication bits of the first bits is greater than or equal to the number of bits required by LBT bandwidth indication bits in the number of required bits, the LBT bandwidth in the uplink resource is the LBT bandwidth indicated by the LBT bandwidth indication bits in the valid bits, where the number of bits of LBT bandwidth indication bits in the valid bits is equal to the number of bits required by the LBT bandwidth indication bits; or if the number of interlace indication bits of the first bits is less than the number of bits required by the interlace indication bits in the number of required bits, the interlace in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

For separate comparisons herein, refer to the foregoing overall comparison implementation. Details are not described again.

The following uses an example in which the first bits are bits that are not truncated for description:

When the reference BWP and the target BWP are different, a frequency domain allocation field in DCI is not adjusted during DCI size alignment.

If a frequency domain resource allocation type of the reference BWP is interlace resource allocation, and a frequency domain resource allocation type of the target BWP is interlace resource allocation, Nr=Nr1+Nr2, and Nd=Nd1+Nd2. For example, fallback DCI 0_0 in a CSS/USS is used to schedule a PUSCH on an active BWP, the reference BWP is an initial BWP and is configured as interlace resource allocation, and the target BWP is a current active BWP and is configured as interlace resource allocation; when non-fallback DCI is used to schedule a PUSCH, BWP switching is performed, that is, the PUSCH on the target BWP is scheduled, where the reference BWP is a current active BWP, and the target BWP is a to-be-scheduled BWP after switching; and the current BWP is configured as interlace resource allocation, and the target BWP is configured as interlace resource allocation.

Nr1 and Nd1, Nr2 and Nd2 are separately compared and redefined, which may be specifically as follows:

If Nr1>=Nd1, Nd1 most significant bits or least significant bits are selected from Nr1 bits to indicate interlace allocation.

If Nr2>=Nd2, Nd2 most significant bits or least significant bits are selected from Nr2 bits to indicate interlace allocation.

If Nr1<Nd1, the following manner may be used:

Manner 1: Zero padding is performed on missing bits to indicate some interlace, that is, the interlace indicated by the interlace indication bits in the valid bits in some interlace of the target BWP.

Manner 2: Row interlace scaling is performed, that is, a granularity for indicating a resource is a scaled granularity, where the scaled granularity (or referred to as a scaling factor) is a fixed value or is obtained through calculation by using Nr1 and Nd1, for example, Nr1/Nd1.

Manner 3: If the first DCI is fallback DCI 0_0 received in a USS, the manner 2 may be used. If the first DCI is fallback DCI 0_0 received in a CSS, the manner 1 may be used.

If Nr2<Nd2, the following manner may be used:

Manner 1: Zero padding is performed on missing bits to indicate some LBT bandwidths, that is, the LBT bandwidth indicated by the LBT bandwidth indication bits in the valid bits in some LBT bandwidths of the target BWP.

Manner 2: A granularity for LBT bandwidth indication is increased, that is, a granularity for indicating a resource is a scaled granularity, where the scaled granularity (scaling factor) is a fixed value or is obtained through calculation by using Nr2 and Nd2 or bandwidths of the target BWP and the reference BWP, for example, Nr2/Nd2 or a bandwidth size of the target BWP/a bandwidth of the reference BWP.

Optionally, if the first DCI is fallback DCI 0_0 received in a USS, the manner 2 may be used. If the first DCI is fallback DCI 0_0 received in a CSS, the manner 1 may be used.

Optionally, in the implementation of determining, based on the number of required bits, the uplink resource indicated by the allocation field, both a frequency domain resource allocation type of the reference BWP and a frequency domain resource allocation type of the target BWP are interlace resource allocation types.

In this implementation, the reference BWP and the target BWP may be different, and in different cases, the first bits may be bits that may not be truncated during DCI size alignment.

It should be noted that when the reference BWP is the same as the target BWP, the uplink resource indicated by the allocation field may be directly determined based on the valid bits without the number of required bits.

Optionally, in the implementation of determining, based on the number of required bits, the uplink resource indicated by the allocation field, a frequency domain resource allocation type of the reference BWP is an interlace resource allocation type, and a resource allocation type of the target BWP is a resource allocation type 0 or a resource allocation type 1.

In this implementation, the valid bits may be M pieces of bit content obtained by dividing all or a part of the first bits. For example, interlace indication bits and/or LBT bandwidth indication bits of the first bits are divided into PRB allocation indication bits.

For example, when the resource allocation type of the reference BWP is interlace resource allocation, and the resource allocation type of the target BWP is the resource allocation type 0/1, Nr=Nr1+Nr2 and Nd (Nd=Nd1) are obtained. For example, fallback DCI 0_0 in a CSS/USS is used to schedule a PUSCH on an active BWP, the reference BWP is an initial BWP and is configured as interlace resource allocation, and the target BWP is a current active BWP and is configured as the resource allocation type 1; or non-fallback DCI is used to indicate BWP switching and the PUSCH is scheduled on the target BWP, the reference BWP is a current active BWP, and the target BWP is a to-be-scheduled BWP after the switching; and the current BWP is configured as interlace resource allocation, and the target BWP is configured as the resource allocation type 0/1.

If Nr>=Nd, Nd bits are selected for indication, for example, Nd most significant bits or least significant bits in Nr.

If Nr<Nd, VRB/RBG allocation indication is performed on all Nr bits, and the following manner may be used:

Manner 1: Only Nr bits are used to indicate some VRBs/RBGs, that is, the indicated VRBs/RBGs are VRB/RBGs indicated by the valid bits in some VRBs/RBGs of the target BWP.

Manner 2: VRB or RBG scaling is performed, that is, a granularity for indicating a resource is a scaled granularity, where the scaled granularity (or referred to as a scaling factor) is a fixed value or is obtained through calculation by using Nr and Nd.

Optionally, if the first DCI is fallback DCI 0_0 received in a USS, the manner 2 may be used. If the first DCI is fallback DCI 0_0 received in a CSS, the manner 1 may be used.

Optionally, in the implementation of determining, based on the number of required bits, the uplink resource indicated by the allocation field, a frequency domain resource allocation type of the reference BWP is a resource allocation type 0 or a resource allocation type 1, and a resource allocation type of the target BWP is an interlace resource allocation type.

In this implementation, the valid bits may be M pieces of bit content obtained by dividing all or a part of the first bits. For example, PRB allocation indication bits of the first bits are divided into interlace indication bits and/or LBT bandwidth indication bits.

For example, when the resource allocation type of the reference BWP is a resource allocation type 0/1, and the resource allocation type of the target BWP is interlace resource allocation, Nr (Nr=Nr1) is obtained, and Nd=Nd1+Nd2. For example, fallback DCI 0_0 in a CSS/USS is used to schedule a PUSCH on an active BWP, the reference BWP is an initial BWP and is configured as the resource allocation type 0/1, and the target BWP is a current active BWP and is configured as interlace resource allocation; or non-fallback DCI is used to indicate BWP switching and the PUSCH is scheduled on the target BWP, the reference BWP is a current active BWP, and the target BWP is a to-be-scheduled BWP after the switching; and the current BWP is configured as the resource allocation type 0/1, and the target BWP is configured as interlace resource allocation.

If Nr>=Nd, Nd bits are selected for indication, where Nd1 bits indicate interlace allocation, and Nd2 bits indicate LBT bandwidth allocation.

If Nr<Nd, all Nr bits are used to perform frequency domain resource indication, Nd1'<=Nd1 bits in Nr bits indicate interlace allocation, Nd2'<=Nd2 bits indicate an LBT bandwidth, and Nd1'+Nd2'=Nr, which may be specifically as follows:

Interlace indication is preferentially ensured, that is, Nd1'=Nd1, and Nd2'=Nr−Nd1';

LBT bandwidth indication is preferentially ensured, that is, Nd2'=Nd2, and Nd1'=Nr−Nd2'; or Nd1' and Nd2' are selected according to a ratio or a predefined rule.

If Nd1'<Nd1, the following manner may be used:

Manner 1: Zero padding is performed on missing bits to indicate some interlace, that is, the interlace indicated by the interlace indication bits in the valid bits in some interlace of the target BWP.

Manner 2: Interlace granularity scaling is performed, that is, a granularity for indicating a resource is a scaled granularity, where the scaled granularity (or referred to as a scaling factor) is a fixed value or may be obtained through calculation by using Nd1' and Nd1, for example, Nd1'/Nd1.

Optionally, if the first DCI is fallback DCI 0_0 received in a USS, the manner 2 may be used. If the first DCI is fallback DCI 0_0 received in a CSS, the manner 1 may be used.

If Nd2'<Nd2, the following manner may be used:

Manner 1: Zero padding is performed on missing bits to indicate some LBT bandwidths, that is, the LBT bandwidth indicated by the LBT bandwidth indication bits in the valid bits in some LBT bandwidths of the target BWP.

Further, if Nd2'=0, the predefined LBT bandwidth is indicated, that is, the LBT bandwidth included in the uplink resource is the predefined LBT bandwidth of the target BWP.

For example, if a scheduled BWP includes an initial BWP, the initial BWP is indicated; otherwise, a BWP with a minimum or maximum index is indicated.

Manner 2: A granularity for LBT bandwidth indication is increased, that is, a granularity for indicating a resource is a scaled granularity, where the scaled granularity (scaling factor) is a fixed value or is obtained through calculation by using Nd2' and Nd2, for example, Nd2'/Nd2.

Optionally, if the first DCI is fallback DCI 0_0 received in a USS, the manner 2 may be used. If the first DCI is fallback DCI 0_0 received in a CSS, the manner 1 may be used.

It should be noted that all the examples in the foregoing implementations are described by using an example in which the first bits may be bits that may not be truncated during DCI size alignment. In the foregoing implementations, the first bits may also be bits that are truncated during DCI size alignment. For example, when the reference BWP is different from the target BWP, and a size of a frequency domain allocation field in DCI is adjusted during size alignment, that is, when size alignment is performed on the frequency domain allocation field in the DCI to change to Nr', Nr, Nr1, and Nr2 in the foregoing example are replaced with Nr', Nr1', and Nr2'. Details are not described herein again.

In an optional implementation, if the first DCI is received in a CSS, the uplink resource is an uplink resource indicated by the valid bits in some resources of the target BWP, or a predefined resource of the target BWP; or if the first DCI is received in a USS, the uplink resource is an uplink resource indicated by the valid bits at an amplified granularity, or a predefined resource of the target BWP.

In this implementation, if the first DCI is received in the CSS, the uplink resource is the uplink resource indicated by the valid bits in some resources of the target BWP, or the predefined resource of the target BWP, or if the first DCI is received in the USS, the uplink resource is the uplink resource indicated by the valid bits at the amplified granularity, or the predefined resource of the target BWP. In this way, the uplink resource allocation manner can be better suited to features of the CSS and the USS, thereby improving overall performance of a communications system.

In this embodiment of the present disclosure, first downlink control information DCI used to schedule transmission of a physical uplink shared channel PUSCH on a target bandwidth part BWP is received, where the first DCI includes an allocation field for frequency domain resource allocation, the allocation field is determined based on a configuration of a reference BWP, and the allocation field includes first bits; and an uplink resource indicated by the allocation field is determined, where the uplink resource is an uplink resource determined based on valid bits of the first bits; and a resource allocation type of at least one of the reference BWP and the target BWP is interlace resource allocation. In this way, the uplink resource indicated by the DCI may be determined based on the valid bits of the first bits, thereby improving transmission performance of a terminal.

Figure 3:
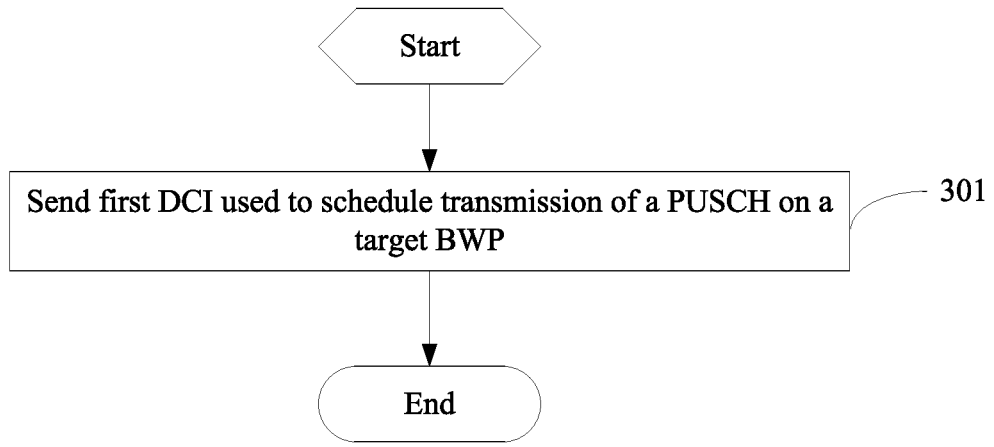
FIG. 3 is a flowchart of an uplink resource indication method according to an embodiment of the present disclosure.

Referring to FIG. 3, FIG. 3 is a flowchart of an uplink resource indication method according to an embodiment of the present disclosure. The method is applied to a network device. As shown in FIG. 3, the method includes the following steps.

Step 301: Send first DCI used to schedule transmission of a PUSCH on a target BWP, where the first DCI includes an allocation field for frequency domain resource allocation, the allocation field is determined based on a configuration of a reference BWP, and the allocation field includes first bits.

The allocation field indicates that an uplink resource is indicated by using valid bits of the first bits; and a resource allocation type of at least one of the reference BWP and the target BWP is interlace resource allocation.

Optionally, the uplink resource includes:

an uplink resource indicated by the valid bits in some resources of the target BWP; or an uplink resource indicated by the valid bits at a scaled granularity; or a predefined uplink resource in resources of the target BWP.

Optionally, the valid bits are all or a part of the first bits; or the valid bits are M pieces of bit content obtained by dividing all or a part of the first bits, where the M pieces of bit content are M resource indications, and M is an integer greater than or equal to 1.

Optionally, the number of bits of the first bits is the number of bits obtained by performing bit truncation on bits of the allocation field determined based on the configuration of the reference BWP during DCI size alignment.

Optionally, the number of bits obtained by performing bit truncation on the bits of the allocation field determined based on the configuration of the reference BWP includes:

the number of bits obtained by performing bit truncation on interlace indication bits of the allocation field determined based on the configuration of the reference BWP; or the number of bits obtained by performing bit truncation on listen before talk LBT bandwidth indication bits of the allocation field determined based on the configuration of the reference BWP; or the number of bits obtained by performing bit truncation on interlace indication bits and LBT bandwidth indication bits of the allocation field determined based on the configuration of the reference BWP.

Optionally, if bit truncation is performed on the interlace indication bits, interlace included in the uplink resource is interlace indicated by interlace indication bits in the valid bits in some interlace of the target BWP, or interlace indicated by interlace indication bits in the valid bits at an amplified granularity; or if bit truncation is performed on the LBT bandwidth indication bits, an LBT bandwidth included in the uplink resource is LBT bandwidth indicated by LBT bandwidth indication bits in the valid bits in some LBT bandwidths of the target BWP, or an LBT bandwidth indicated by LBT bandwidth indication bits in the valid bits at an amplified granularity, or a predefined LBT bandwidth of the target BWP.

Optionally, the uplink resource includes an uplink resource that is indicated by the valid bits and that is determined based on the number of required bits, where the number of required bits is the number that is of bits required by the field for frequency domain resource allocation in the DCI used to schedule transmission of the PUSCH on the target BWP and that is determined based on a configuration of the target BWP.

Optionally, if the number of bits of the first bits is greater than or equal to the number of required bits, and the number of bits of the valid bits is equal to the number of required bits; or if the number of bits of the first bits is less than the number of required bits, the uplink resource is the uplink resource indicated by the valid bits in some resources of the target BWP, or the uplink resource indicated by the valid bits at the scaled granularity, or the predefined uplink resource in the resources of the target BWP.

Optionally, in a case that the number of bits of the first bits is less than the number of required bits:

if the first bits include interlace indication bits and/or LBT bandwidth indication bits, the number of interlace indication bits is less than or equal to the number of bits required by interlace indication bits in the number of required bits, and/or the number of LBT bandwidth indication bits is less than or equal to the number of bits required by LBT bandwidth indication bits in the number of required bits.

Optionally, if the number of interlace indication bits of the first bits is less than the number of bits required by the interlace indication bits in the number of required bits, the interlace included in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

Optionally, the interlace indication bits and/or the LBT bandwidth indication bits included in the valid bits are obtained by dividing all or a part of the first bits, where the first bits include interlace indication bits and/or LBT bandwidth indication bits.

Optionally, if the number of interlace indication bits of the first bits is greater than or equal to the number of bits required by interlace indication bits in the number of required bits, the interlace in the uplink resource is the interlace indicated by the interlace indication bits in the valid bits, where the number of bits of interlace indication bits in the valid bits is equal to the number of bits required by the interlace indication bits; or if the number of LBT bandwidth indication bits of the first bits is greater than or equal to the number of bits required by LBT bandwidth indication bits in the number of required bits, the LBT bandwidth in the uplink resource is the LBT bandwidth indicated by the LBT bandwidth indication bits in the valid bits, where the number of bits of LBT bandwidth indication bits in the valid bits is equal to the number of bits required by the LBT bandwidth indication bits; or if the number of interlace indication bits of the first bits is less than the number of bits required by the interlace indication bits in the number of required bits, the interlace in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

Optionally, both a frequency domain resource allocation type of the reference BWP and a frequency domain resource allocation type of the target BWP are an interlace resource allocation type; or a frequency domain resource allocation type of the reference BWP is an interlace resource allocation type, and a resource allocation type of the target BWP is a resource allocation type 0 or a resource allocation type 1; or a frequency domain resource allocation type of the reference BWP is a resource allocation type 0 or a resource allocation type 1, and a resource allocation type of the target BWP is an interlace resource allocation type.

Optionally, if the first DCI is received in a common search space CSS, the uplink resource is an uplink resource indicated by the valid bits in some resources of the target BWP, or a predefined resource of the target BWP; or if the first DCI is received in a UE-specific search space USS, the uplink resource is an uplink resource indicated by the valid bits at an amplified granularity, or a predefined resource of the target BWP.

Optionally, the first DCI is fallback DCI; or the first DCI is non-fallback DCI indicating switching of a BWP and scheduling transmission of the PUSCH on the target BWP after the switching.

It should be noted that this embodiment is used as an implementation of the network device side corresponding to the embodiment shown in FIG. 2. For a specific implementation, refer to the related descriptions of the embodiment shown in FIG. 2. To avoid repeated descriptions, details are not described again in this embodiment. In this embodiment, transmission performance of a terminal can also be improved.

The following uses an example in which the first DCI is fallback DCI or non-fallback DCI to describe the uplink resource determining method and the uplink resource indication method provided in the embodiments of the present disclosure, which may include the following:

I. The fallback DCI is transmitted in a CSS, and a scheduled PUSCH is transmitted on an active UL BWP.

If the active UL BWP is not greater than 20 MHz, an allocated LBT bandwidth does not need to be indicated. When the number of bits of an allocation field in DCI is insufficient, padding is performed (to indicate some resources) or an indication granularity is increased, or when the number of bits is sufficient, valid bits are selected.

If the active UL BWP is greater than 20 MHz, an allocated LBT bandwidth needs to be indicated. When the number of bits of an allocation field in DCI is insufficient, the bits are only used to indicate interlace allocation (some interlace may be indicated or a granularity is increased), or when the number of bits is sufficient, some bits are truncated to indicate allocated interlace, and some bits are used to indicate the allocated LBT bandwidth.

If an initial BWP is interlace resource allocation, because the initial BWP does not exceed 20 MHz, and there is no LBT bandwidth indication field in DCI, when DCI in a CSS is used to schedule transmission of a PUSCH on an active BWP, the LBT bandwidth may be predefined as all LBT bandwidths on the active BWP, or an LBT bandwidth with a minimum index.

II. For FDRA of fallback DCI in a CSS/USS, most significant bits (MSB) are truncated due to DCI size alignment.

If an interlace indication part is truncated, the following manner is used:

Manner 1: Some interlace is indicated.

Manner 2: A granularity for interlace indication is increased.

Manner 3: The manner 2 is used for a USS, and the manner 1 is used for a CSS.

For the manner 1, the manner 2, and the manner 3, refer to the corresponding descriptions of the embodiment shown in FIG. 2.

If an LBT bandwidth indication part is truncated, the following manner is used:

Manner 1: Some LBT bandwidth are indicated.

Manner 2: A granularity for LBT bandwidth indication is increased.

Manner 3: The manner 2 is used for a USS, and the manner 1 is used for a CSS.

Similarly, when the LBT bandwidth indication part is completely truncated, the LBT bandwidth may be predefined as all LBT bandwidths on an active BWP, or an LBT bandwidth with a minimum index.

III. When non-fallback DCI is used to schedule a PUSCH, BWP switching is indicated. That is, FDRA of DCI 0_1 is determined based on an active UL BWP, and the PUSCH is scheduled to be transmitted on a target UL BWP (different from the active UL BWP). The following cases may be included:

1. FDRA in DCI includes the number of bits indicating interlace allocation and the number of bits indicating LBT bandwidth allocation (possibly 0), which are used to indicate interlace allocation and LBT bandwidth allocation of the target UL BWP.

If the number of bits of FDRA in the DCI is greater than the number of required bits, required MSBs/least significant bits (LSB) may be selected.

If the number of bits of FDRA in the DCI is less than the number of required bits, zero padding (an MSB/LSB is padded with 0) may be performed to indicate some resources, or an indication granularity is increased. In addition, an LBT bandwidth may be one LBT bandwidth or all LBT bandwidths in the target UL BWP by default, that is, the predefined LBT bandwidth.

2. FDRA in DCI includes the number of bits indicating interlace allocation, and a field indicating LBT bandwidth allocation is a separate field. The number of bits indicating interlace allocation and the number of bits indicating LBT bandwidth allocation (possibly 0) are separately used to indicate interlace allocation and LBT bandwidth allocation of the target UL BWP.

If the number of bits for LBT bandwidth indication in FDRA in the DCI is greater than the number of required bits, requires bits (MSB/LSB) may be selected.

If the number of bits for LBT bandwidth indication in FDRA in the DCI is less than the number of required bits, zero padding (an MSB/LSB is padded with 0) may be performed to indicate some resources, or an indication granularity is increased. In addition, an LBT bandwidth may be one LBT bandwidth or all LBT bandwidths in the target UL BWP by default, that is, the predefined LBT bandwidth.

Embodiment 1

In this embodiment, it is assumed that resource allocation types of a scheduled PUSCH are the same when fallback DCI is transmitted in a CSS and a USS, and are interlaced resource allocation. The following several scenarios may be included:

Scenario 1

For example, a subcarrier spacing of an initial UL BWP is 15 kHz, a bandwidth of an active UL BWP is 20 MHz, and a subcarrier spacing is 30 kHz.

When DCI 0_0 is detected in a CSS, a resource allocation manner used by a PUSCH scheduled by DCI 0_0 is interlaced resource allocation, that is, FDRA includes 6/10 bits indicating allocated interlace.

When DCI 0_0 is detected in a USS, a resource allocation manner used by a PUSCH scheduled by DCI 0_0 is interlaced resource allocation, that is, FDRA includes 5 bits indicating allocated interlace.

When UE detects DCI 0_0 in a CSS, 5 bits are selected from 6/10 bits included in FDRA, for example, 5 least significant bits or most significant bits are selected.

It should be noted that the detection of DCI 0_0 in the USS is only an assumption, and the terminal is not required to detect DCI 0_0 in the USS to select 5 bits from 6/10 bits included in FDRA. For example, 5 least significant bits or most significant bits are selected. The same is true for other embodiments, and details are not described herein again.

Scenario 2

For example, a subcarrier spacing of an initial UL BWP is 30 kHz, a bandwidth of an active UL BWP is 20 MHz, and a subcarrier spacing is 15 kHz.

When DCI 0_0 is detected in a CSS, a resource allocation manner used by a PUSCH scheduled by DCI 0_0 is interlaced resource allocation, that is, FDRA includes 5 bits indicating allocated interlace.

When DCI 0_0 is detected in a USS, a resource allocation manner used by a PUSCH scheduled by DCI 0_0 is interlaced resource allocation, that is, FDRA includes 6/10 bits indicating allocated interlace.

When the UE detects DCI 0_0 in a CSS, 5 bits included in FDRA are expanded to 6/10 bits, for example, least significant bits are padded with 1/5 bits 0 and most significant bits are padded with 1/5 bits 0, that is, some interlace resources are indicated.

Scenario 3

For example, a subcarrier spacing of an initial UL BWP is 15 kHz, a bandwidth of an active UL BWP is 40 MHz, and a subcarrier spacing is 30 kHz.

When DCI 0_0 is detected in a CSS, a resource allocation manner used by a PUSCH scheduled by DCI 0_0 is interlaced resource allocation, that is, FDRA includes 6/10 bits indicating allocated interlace.

When DCI 0_0 is detected in a USS, a resource allocation manner used by a PUSCH scheduled by DCI 0_0 is interlaced resource allocation, that is, FDRA includes 5 bits indicating allocated interlace, and 2 bits are required to indicate an allocated LBT bandwidth.

When UE detects DCI 0_0 in a CSS, 5 bits are selected from 6/10 bits included in FDRA, for example, 5 least significant bits or most significant bits are selected. The selected 5 bits are used to indicate the allocated interlace, which may be specifically as follows:

FDRA includes 6 bits, and after 5 bits are selected, the remaining 1 bit is used to indicate the allocated LBT bandwidth. A granularity for LBT bandwidth allocation is a cell (the number of LBT bandwidths included in the BWP/ the number of bits for LBT bandwidth indication), that is, cell (2/1)=2; or FDRA includes 10 bits, and after 5 bits are selected, 2 least significant bits or most significant bits are selected from remaining 5 bits to indicate an allocated LBT bandwidth.

That is, for fallback DCI, a PUSCH is scheduled in a CSS to be transmitted on an active UL BWP. If the number of bits in FDRA is inconsistent with the number of required bits (the number of bits of the fallback DCI in a USS), the following steps may be included:

Step 1: Determine a part for indicating interlace.

If the number of bits is insufficient, the following may be performed:

Zero padding is performed to obtain the number of required bits; or a granularity for interlace indication is increased.

If the number exceeds, the required bits are selected.

Step 2: Determine a part for indicating the LBT bandwidth.

If the number of bits in FDRA is large, and there are still remaining bits after the selection in step 1, the following may be performed:

if the remaining bits are not enough to indicate the LBT bandwidth, zero padding is performed or a granularity for LBT bandwidth indication is increased; or if the remaining bits are enough to indicate the LBT bandwidth, the required bits are selected.

If the number of bits in FDRA is large, and there is no remaining bit after the selection in step 1, the following may be performed:

One LBT bandwidth or all LBT bandwidths in the active UL BWP are indicated by default, for example, an LBT bandwidth with a minimum or maximum index, or all LBT bandwidths. Alternatively, if the initial UL BWP is included in the active UL BWP, an LBT bandwidth in the initial UL BWP overlaps with an LBT bandwidth in the active UL BWP, the overlapped LBT bandwidth is indicated; otherwise, an LBT bandwidth with a minimum or maximum index, or all LBT bandwidths are indicated.

It should be noted that step 1 and step 2 may be reversed. That is, the number of bits selected to indicate the LBT bandwidth is first determined, and remaining bits are used to indicate the interlace. If the remaining bits are enough, the remaining bits are selected. If not, zero padding is performed or an indication granularity is increased.

Embodiment 2

In this embodiment, it is assumed that resource allocation types of a scheduled PUSCH are different when fallback DCI is in a CSS and a USS. For the CSS, a resource allocation type is a type 1, and for the USS, a resource allocation type is interlaced resource allocation. The following several scenarios may be included:

Scenario 1

For example, a subcarrier spacing of an initial UL BWP is 30 kHz, a bandwidth of an active UL BWP is 20 MHz, and a subcarrier spacing is 15 kHz.

When DCI 0_0 is detected in a CSS, a resource allocation manner used by a PUSCH scheduled by DCI 0_0 is a resource allocation type 1, that is, FDRA includes an allocated VRB indicated by $\lceil \log 2 \ (51*52/2) \rceil = 11$ bits.

When DCI 0_0 is detected in a USS, a resource allocation manner used by a PUSCH scheduled by DCI 0_0 is interlaced resource allocation, that is, FDRA includes 6/10 bits indicating allocated interlace.

When UE detects DCI 0_0 in a CSS, 6/10 bits are selected from 11 bits included in FDRA, for example, 6/10 least significant bits or most significant bits.

Scenario 2

For example, a subcarrier spacing of an initial UL BWP is 30 kHz, a bandwidth of an active UL BWP is 80 MHz, and a subcarrier spacing is 15 kHz.

When DCI 0_0 is detected in a CSS, a resource allocation manner used by a PUSCH scheduled by DCI 0_0 is a resource allocation type 1, that is, FDRA includes an allocated VRB indicated by $\lceil \log 2 \ (51*52/2) \rceil = 11$ bits.

When DCI 0_0 is detected in a USS, a resource allocation manner used by a PUSCH scheduled by DCI 0_0 is interlaced resource allocation, that is, FDRA includes 6/10 bits indicating allocated interlace, and further includes a 4-bit bitmap indicating an allocated LBT bandwidth.

When UE detects DCI 0_0 in a CSS, 11 bits included in FDRA may include the following cases:

If DCI 0_0 is detected in a USS, FDRA includes 6 bits indicating allocated interlace and a 4-bit bitmap indicating an allocated LBT bandwidth. For example, 6 bits are selected from 11 bits of FDRA to indicate the allocated interlace, and the remaining 4 bits are selected to indicate the allocated LBT bandwidth (that is, 10 bits are selected, where 6 bits are used to indicate the allocated interlace, and 4 bits are used to indicate the allocated LBT bandwidth).

If DCI 0_0 is detected in a USS, FDRA includes 10 bits indicating allocated interlace and a 4-bit bitmap indicating an allocated LBT bandwidth. For example, 10 bits are selected from 11 bits of FDRA to indicate the allocated interlace, and the remaining 1 bit is used to indicate the allocated LBT bandwidth; or 4 bits are selected from 11 bits of FDRA to indicate the allocated LBT bandwidth, and the remaining 7 bits are used to indicate the allocated interlace, where the 7 bits may be: a 7-bit bitmap corresponds to interlace 0-6, or 5 bits are selected from 7 bits, and a 5-bit bitmap is used to indicate the allocated interlace. A granularity for interlace allocation is 2.

Embodiment 3

In this implementation, resource allocation types of an active UL BWP and a target UL BWP scheduled by non-fallback DCI are the same, and both are interlaced resource allocation manners. The following several scenarios may be included:

Scenario 1

Bandwidths are all greater than 20 MHz, and include LBT bandwidth indication bits.

It is assumed that a bandwidth of the active UL BWP is 40 MHz, an SCS is 15 kHz, a bandwidth of the target UL BWP is 60 MHz, and an SCS is 30 kHz.

The number of bits included in FDRA in the non-fallback DCI: a 6-bit RIV or 10-bit bitmap is used to indicate allocated interlace and a 2-bit bitmap/RIV is used to indicate an allocated LBT bandwidth.

The number of bits required by FDRA in the target UL BWP: A 5-bit bitmap is used for allocated interlace and a 3-bit bitmap/RIV is used to indicate an allocated LBT bandwidth. In this case, the following methods may be included:

Method 1: The number of bits indicating interlace and the number of bits indicating an LBT bandwidth are used to indicate interlace and an LBT bandwidth of the target UL BWP, that is, 8 bits of 6+2 are interpreted as 5+3, or 8 bits (5+3) are selected from 12 bits of 10+2.

Method 2: The number of bits indicating interlace is used to indicate interlace of the target BWP; and the number of bits indicating an LBT bandwidth is used to indicate an LBT bandwidth of the target BWP. Zero padding is performed on 5 bits to obtain 6 bits or zero padding is performed on 5 bits to obtain 10 bits, or a granularity for LBT bandwidth indication is increased.

Scenario 2

A bandwidth of the active UL BWP is 20 MHz, and a bandwidth of the target UL BWP is greater than 20 MHz and includes LBT bandwidth indicator bits.

It is assumed that a bandwidth of the active UL BWP is 20 MHz, an SCS is 15 kHz, a bandwidth of the target UL BWP is 60 MHz, and an SCS is 30 kHz.

The number of bits included in FDRA in the non-fallback DCI: a 6-bit RIV or 10-bit bitmap is used for allocated interlace and 0 bit is used to indicate an allocated LBT bandwidth.

The number of bits required by FDRA in the target UL BWP: A 5-bit bitmap is used for allocated interlace and a 3-bit bitmap/RIV is used to indicate an allocated LBT bandwidth. In this case, the following methods may be included:

Method 1: The number of bits indicating interlace and the number of bits indicating an LBT bandwidth are used to indicate interlace and an LBT bandwidth of the target UL BWP, that is, 6 bits of 6+0 are interpreted as 5+3, or 8 bits (5+3) are selected from 10 bits of 10+0.

Method 2: The number of bits indicating interlace is used to indicate interlace of the target BWP; and the number of bits indicating an LBT bandwidth is used to indicate an LBT bandwidth of the target BWP. 5 bits are selected from 6 or 10 bits, and 0 bit is used to indicate the LBT bandwidth of the target BWP, that is, all LBT bandwidths or one interlace is indicated by default.

Embodiment 4

In this embodiment, resource allocation types of non-fallback DCI are different, and the following several scenarios may be included:

Scenario 1: A resource allocation type of an active UL BWP is a type 1, a bandwidth is 20 MHZ, an SCS is 15 kHz, a resource allocation type of a target UL BWP is interlaced, a bandwidth is 80 MHZ, and an SCS is 30 kHz.

The number of bits included in FDRA in the non-fallback DCI: an 11-bit RIV is used for an allocated VRB and 0 bit is used to indicate an allocated LBT bandwidth.

The number of bits required by FDRA in the target UL BWP: A 5-bit bitmap is used for allocated interlace and a +4-bit bitmap/RIV is used to indicate an allocated LBT bandwidth.

5 bits are selected from 11 bits to indicate allocated interlace, and then a 4-bit bitmap is selected to indicate an allocated LBT bandwidth.

Scenario 2: A resource allocation type of an active UL BWP is interlaced, a bandwidth is 40 MHZ, an SCS is 30 kHz, a resource allocation type of a target UL BWP is a type 2, a bandwidth is 40 MHZ, an SCS is 30 kHz, and an RBG size P=8.

The number of bits included in FDRA in the non-fallback DCI: a 5-bit bitmap is used for allocated interlace and a 2-bit bitmap/RIV is used to indicate an allocated LBT bandwidth.

The number of bits required by FDRA in the target UL BWP: a $\lceil 106/8 \rceil$=14-bit bitmap is used for an allocated RBG.

5+2 bits are used to indicate the allocated RBG, which may be specifically as follows:

Manner 1: Zero padding is performed to obtain 14 bits.
Manner 2: A size of the RBG is increased to $P^*\lceil 14/7 \rceil$=16.

Embodiment 5

In this embodiment, FDRA in Fallback DCI is truncated or padding is performed on FDRA due to DCI size alignment.

During DCI size alignment, sizes of DCI 0_0 and DCI 1_0 (scheduling a same serving cell) in a CSS need to be the same. If the number of bits of DCI 0_0 is greater than the number of bits of DCI 1_0, bits in FDRA in DCI 0_0 are truncated so that the number of bits of DCI 0_0 is the same as the number of bits of DCI 1_0 (truncation starts from an MSB).

For example, a subcarrier spacing of an initial UL BWP is 15 kHz, that is, FDRA includes 6/10 bits, which are truncated as 3 bits. In this case, the following manner may be used:

Manner 1: Only 3 bits are used to indicate some interlace, that is, zero padding is performed on 3/7 bits of MSB/LSB to obtain 6/10 bits.

Manner 2: A granularity for interlace indication is increased.

Alternatively, during DCI size alignment, sizes of DCI 0_0 and DCI 1_0 (scheduling a same serving cell) in a USS need to be the same. If the number of bits of DCI 0_0 is greater than the number of bits of DCI 1_0, bits in FDRA are truncated so that the number of bits is the same as the number of bits of DCI 1_0 (truncation starts from an MSB).

For example, if a subcarrier spacing of an active UL BWP is 30 kHz, and a bandwidth is 80 MHz, that is, 5+4 bits in FDRA are separately used to indicate interlace and an LBT bandwidth, and are truncated as 3 bits. In this case, the following manner may be used:

Manner 1: Only 3 bits are used to indicate some interlace, that is, zero padding is performed on MSBs/LSBs to obtain 5 bits, and an LBT bandwidth is predefined as one or all LBT bandwidths.

Manner 2: A granularity for interlace indication is increased, and an LBT bandwidth is predefined as one or all LBT bandwidths.

Figure 4:
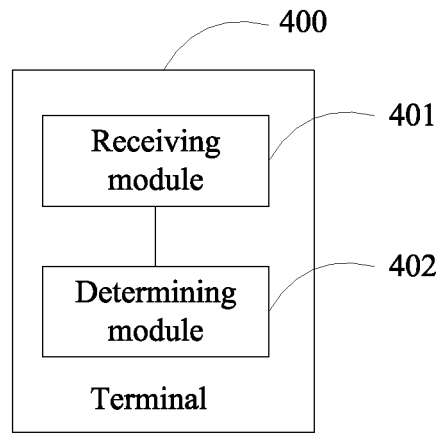
FIG. 4 is a structural diagram of a terminal according to an embodiment of the present disclosure.

Referring to FIG. 4, FIG. 4 is a structural diagram of a terminal according to an embodiment of the present disclosure. As shown in FIG. 4, a terminal 400 includes:

a receiving module 401, configured to receive first downlink control information DCI used to schedule transmission of a physical uplink shared channel PUSCH on a target bandwidth part BWP, where the first DCI includes an allocation field for frequency domain resource allocation, the allocation field is determined based on a configuration of a reference BWP, and the allocation field includes first bits; and a determining module 402, configured to determine an uplink resource indicated by the allocation field, where the uplink resource is an uplink resource determined based on valid bits of the first bits; and a resource allocation type of at least one of the reference BWP and the target BWP is interlace resource allocation.

Optionally, the uplink resource includes:

an uplink resource indicated by the valid bits in some resources of the target BWP; or an uplink resource indicated by the valid bits at a scaled granularity; or a predefined uplink resource in resources of the target BWP.

Optionally, the valid bits are all or a part of the first bits; or the valid bits are M pieces of bit content obtained by dividing all or a part of the first bits, where the M pieces of bit content are M resource indications, and M is an integer greater than or equal to 1.

Optionally, the number of bits of the first bits is the number of bits obtained by performing bit truncation on bits of the allocation field determined based on the configuration of the reference BWP during DCI size alignment.

Optionally, the number of bits obtained by performing bit truncation on the bits of the allocation field determined based on the configuration of the reference BWP during DCI size alignment includes:

the number of bits obtained by performing bit truncation on interlace indication bits of the allocation field determined based on the configuration of the reference BWP; or the number of bits obtained by performing bit truncation on listen before talk LBT bandwidth indication bits of the allocation field determined based on the configuration of the reference BWP; or the number of bits obtained by performing bit truncation on interlace indication bits and LBT bandwidth indication bits of the allocation field determined based on the configuration of the reference BWP.

Optionally, if bit truncation is performed on the interlace indication bits, interlace included in the uplink resource is interlace indicated by interlace indication bits in the valid bits in some interlace of the target BWP, or interlace indicated by interlace indication bits in the valid bits at an amplified granularity; or if bit truncation is performed on the LBT bandwidth indication bits, an LBT bandwidth included in the uplink resource is LBT bandwidth indicated by LBT bandwidth indication bits in the valid bits in some LBT bandwidths of the target BWP, or an LBT bandwidth indicated by LBT bandwidth indication bits in the valid bits at an amplified granularity, or a predefined LBT bandwidth of the target BWP.

Optionally, the determining an uplink resource indicated by the allocation field includes:

determining, based on a configuration of the target BWP, the number of bits required by the field for frequency domain resource allocation in the DCI used to schedule transmission of the PUSCH on the target BWP; and determining, based on the number of required bits, the uplink resource indicated by the allocation field.

Optionally, if the number of bits of the first bits is greater than or equal to the number of required bits, and the number of bits of the valid bits is equal to the number of required bits; or if the number of bits of the first bits is less than the number of required bits, the uplink resource is the uplink resource indicated by the valid bits in some resources of the target BWP, or the uplink resource indicated by the valid bits at the scaled granularity, or the predefined uplink resource in the resources of the target BWP.

Optionally, in a case that the number of bits of the first bits is less than the number of required bits:

if the first bits include interlace indication bits and/or LBT bandwidth indication bits, the number of interlace indication bits is less than or equal to the number of bits required by interlace indication bits in the number of required bits, and/or the number of LBT bandwidth indication bits is less than or equal to the number of bits required by LBT bandwidth indication bits in the number of required bits.

Optionally, if the number of interlace indication bits of the first bits is less than the number of bits required by the interlace indication bits in the number of required bits, the interlace included in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

Optionally, the interlace indication bits and/or the LBT bandwidth indication bits included in the valid bits are obtained by dividing all or a part of the first bits, where the first bits include interlace indication bits and/or LBT bandwidth indication bits.

Optionally, if the number of interlace indication bits of the first bits is greater than or equal to the number of bits required by interlace indication bits in the number of required bits, the interlace in the uplink resource is the interlace indicated by the interlace indication bits in the valid bits, where the number of bits of interlace indication bits in the valid bits is equal to the number of bits required by the interlace indication bits; or if the number of LBT bandwidth indication bits of the first bits is greater than or equal to the number of bits required by LBT bandwidth indication bits in the number of required bits, the LBT bandwidth in the uplink resource is the LBT bandwidth indicated by the LBT bandwidth indication bits in the valid bits, where the number of bits of LBT bandwidth indication bits in the valid bits is equal to the number of bits required by the LBT bandwidth indication bits; or if the number of interlace indication bits of the first bits is less than the number of bits required by the interlace indication bits in the number of required bits, the interlace in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

Optionally, both a frequency domain resource allocation type of the reference BWP and a frequency domain resource allocation type of the target BWP are an interlace resource allocation type; or a frequency domain resource allocation type of the reference BWP is an interlace resource allocation type, and a resource allocation type of the target BWP is a resource allocation type 0 or a resource allocation type 1; or a frequency domain resource allocation type of the reference BWP is a resource allocation type 0 or a resource allocation type 1, and a resource allocation type of the target BWP is an interlace resource allocation type.

Optionally, if the first DCI is received in a common search space CSS, the uplink resource is an uplink resource indicated by the valid bits in some resources of the target BWP, or a predefined resource of the target BWP; or if the first DCI is received in a UE-specific search space USS, the uplink resource is an uplink resource indicated by the valid bits at an amplified granularity, or a predefined resource of the target BWP.

Optionally, the first DCI is fallback DCI; or the first DCI is non-fallback DCI indicating switching of a BWP and scheduling transmission of the PUSCH on the target BWP after the switching.

The terminal provided in this embodiment of the present disclosure can implement the processes implemented by the terminal in the method embodiment in FIG. 2. To avoid repetition, details are not described herein again. In this way, transmission performance of the terminal can be improved.

Figure 5:
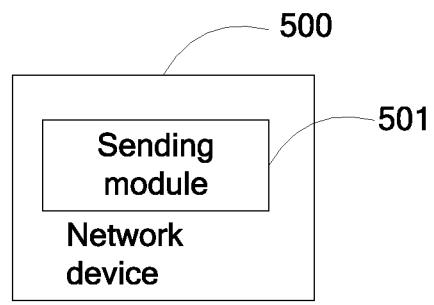
FIG. 5 is a structural diagram of a network device according to an embodiment of the present disclosure.

Referring to FIG. 5, FIG. 5 is a structural diagram of a network device according to an embodiment of the present disclosure. As shown in FIG. 5, a network device 500 includes:

a sending module 501, configured to send first downlink control information DCI used to schedule transmission of a physical uplink shared channel PUSCH on a target bandwidth part BWP, where the first DCI includes an allocation field for frequency domain resource allocation, the allocation field is determined based on a configuration of a reference BWP, and the allocation field includes first bits; and the allocation field indicates that an uplink resource is indicated by using valid bits of the first bits; and a resource allocation type of at least one of the reference BWP and the target BWP is interlace resource allocation.

Optionally, the uplink resource includes:

an uplink resource indicated by the valid bits in some resources of the target BWP; or an uplink resource indicated by the valid bits at a scaled granularity; or a predefined uplink resource in resources of the target BWP.

Optionally, the valid bits are all or a part of the first bits; or the valid bits are M pieces of bit content obtained by dividing all or a part of the first bits, where the M pieces of bit content are M resource indications, and M is an integer greater than or equal to 1.

Optionally, the number of bits of the first bits is the number of bits obtained by performing bit truncation on bits of the allocation field determined based on the configuration of the reference BWP during DCI size alignment.

Optionally, the number of bits obtained by performing bit truncation on the bits of the allocation field determined based on the configuration of the reference BWP during DCI size alignment includes:

the number of bits obtained by performing bit truncation on interlace indication bits of the allocation field determined based on the configuration of the reference BWP; or the number of bits obtained by performing bit truncation on listen before talk LBT bandwidth indication bits of the allocation field determined based on the configuration of the reference BWP; or the number of bits obtained by performing bit truncation on interlace indication bits and LBT bandwidth indication bits of the allocation field determined based on the configuration of the reference BWP.

Optionally, if bit truncation is performed on the interlace indication bits, interlace included in the uplink resource is interlace indicated by interlace indication bits in the valid bits in some interlace of the target BWP, or interlace indicated by interlace indication bits in the valid bits at an amplified granularity; or if bit truncation is performed on the LBT bandwidth indication bits, an LBT bandwidth included in the uplink resource is LBT bandwidth indicated by LBT bandwidth indication bits in the valid bits in some LBT bandwidths of the target BWP, or an LBT bandwidth indicated by LBT bandwidth indication bits in the valid bits at an amplified granularity, or a predefined LBT bandwidth of the target BWP.

Optionally, the uplink resource includes an uplink resource that is indicated by the valid bits and that is determined based on the number of required bits, where the number of required bits is the number that is of bits required by the field for frequency domain resource allocation in the DCI used to schedule transmission of the PUSCH on the target BWP and that is determined based on a configuration of the target BWP.

Optionally, if the number of bits of the first bits is greater than or equal to the number of required bits, and the number of bits of the valid bits is equal to the number of required bits; or if the number of bits of the first bits is less than the number of required bits, the uplink resource is the uplink resource indicated by the valid bits in some resources of the target BWP, or the uplink resource indicated by the valid bits at the scaled granularity, or the predefined uplink resource in the resources of the target BWP.

Optionally, in a case that the number of bits of the first bits is less than the number of required bits:

if the first bits include interlace indication bits and/or LBT bandwidth indication bits, the number of interlace indication bits is less than or equal to the number of bits required by interlace indication bits in the number of required bits, and/or the number of LBT bandwidth indication bits is less than or equal to the number of bits required by LBT bandwidth indication bits in the number of required bits.

Optionally, if the number of interlace indication bits of the first bits is less than the number of bits required by the interlace indication bits in the number of required bits, the interlace included in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

Optionally, the interlace indication bits and/or the LBT bandwidth indication bits included in the valid bits are obtained by dividing all or a part of the first bits, where the first bits include interlace indication bits and/or LBT bandwidth indication bits.

Optionally, if the number of interlace indication bits of the first bits is greater than or equal to the number of bits required by interlace indication bits in the number of required bits, the interlace in the uplink resource is the interlace indicated by the interlace indication bits in the valid bits, where the number of bits of interlace indication bits in the valid bits is equal to the number of bits required by the interlace indication bits; or if the number of LBT bandwidth indication bits of the first bits is greater than or equal to the number of bits required by LBT bandwidth indication bits in the number of required bits, the LBT bandwidth in the uplink resource is the LBT bandwidth indicated by the LBT bandwidth indication bits in the valid bits, where the number of bits of LBT bandwidth indication bits in the valid bits is equal to the number of bits required by the LBT bandwidth indication bits; or if the number of interlace indication bits of the first bits is less than the number of bits required by the interlace indication bits in the number of required bits, the interlace in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

Optionally, both a frequency domain resource allocation type of the reference BWP and a frequency domain resource allocation type of the target BWP are an interlace resource allocation type; or a frequency domain resource allocation type of the reference BWP is an interlace resource allocation type, and a resource allocation type of the target BWP is a resource allocation type 0 or a resource allocation type 1; or a frequency domain resource allocation type of the reference BWP is a resource allocation type 0 or a resource allocation type 1, and a resource allocation type of the target BWP is an interlace resource allocation type.

Optionally, if the first DCI is received in a common search space CSS, the uplink resource is an uplink resource indicated by the valid bits in some resources of the target BWP, or a predefined resource of the target BWP; or if the first DCI is received in a UE-specific search space USS, the uplink resource is an uplink resource indicated by the valid bits at an amplified granularity, or a predefined resource of the target BWP.

Optionally, the first DCI is fallback DCI; or the first DCI is non-fallback DCI indicating switching of a BWP and scheduling transmission of the PUSCH on the target BWP after the switching.

The network device provided in this embodiment of the present disclosure can implement the processes implemented by the terminal in the method embodiment in FIG. 3. To avoid repetition, details are not described herein again. In this way, transmission performance of the terminal can be improved.

Figure 6:
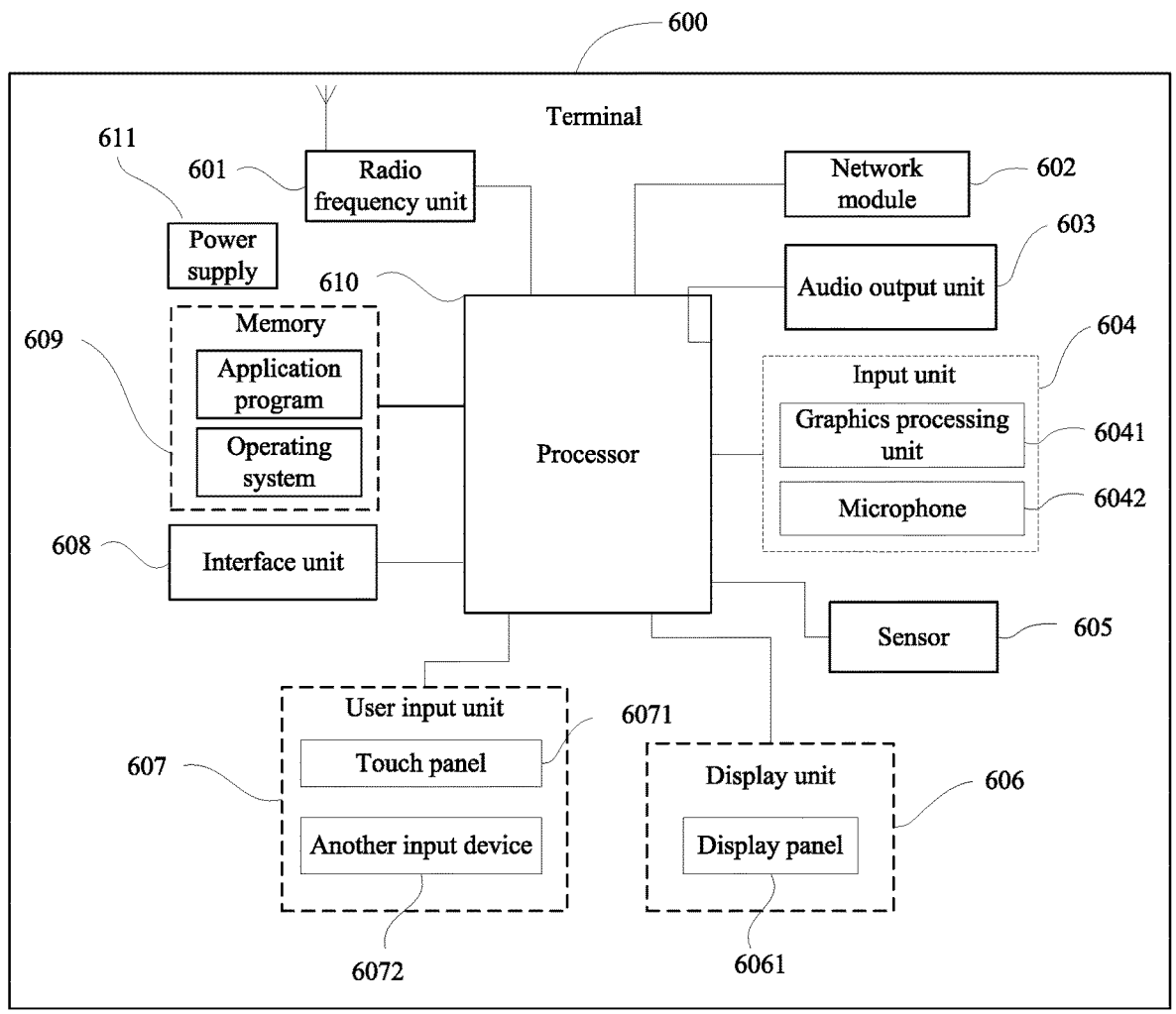
FIG. 6 is a structural diagram of another terminal according to an embodiment of the present disclosure.

FIG. 6 is a schematic diagram of a hardware structure of a terminal according to the embodiments of the present disclosure.

A terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. It can be understood by a person skilled in the art that, the terminal structure shown in FIG. 6 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a robot, a wearable device, a pedometer, and the like.

The radio frequency unit 601 is configured to receive first downlink control information DCI used to schedule transmission of a physical uplink shared channel PUSCH on a target bandwidth part BWP, where the first DCI includes an allocation field for frequency domain resource allocation, the allocation field is determined based on a configuration of a reference BWP, and the allocation field includes first bits.

The processor 610 is configured to determine an uplink resource indicated by the allocation field, where the uplink resource is an uplink resource determined based on valid bits of the first bits.

A resource allocation type of at least one of the reference BWP and the target BWP is interlace resource allocation.

Optionally, the uplink resource includes:

an uplink resource indicated by the valid bits in some resources of the target BWP; or an uplink resource indicated by the valid bits at a scaled granularity; or a predefined uplink resource in resources of the target BWP.

Optionally, the valid bits are all or a part of the first bits; or the valid bits are M pieces of bit content obtained by dividing all or a part of the first bits, where the M pieces of bit content are M resource indications, and M is an integer greater than or equal to 1.

Optionally, the number of bits of the first bits is the number of bits obtained by performing bit truncation on bits of the allocation field determined based on the configuration of the reference BWP during DCI size alignment.

Optionally, the number of bits obtained by performing bit truncation on the bits of the allocation field determined based on the configuration of the reference BWP during DCI size alignment includes:

the number of bits obtained by performing bit truncation on interlace indication bits of the allocation field determined based on the configuration of the reference BWP; or the number of bits obtained by performing bit truncation on listen before talk LBT bandwidth indication bits of the allocation field determined based on the configuration of the reference BWP; or the number of bits obtained by performing bit truncation on interlace indication bits and LBT bandwidth indication bits of the allocation field determined based on the configuration of the reference BWP.

Optionally, if bit truncation is performed on the interlace indication bits, interlace included in the uplink resource is interlace indicated by interlace indication bits in the valid bits in some interlace of the target BWP, or interlace indicated by interlace indication bits in the valid bits at an amplified granularity; or if bit truncation is performed on the LBT bandwidth indication bits, an LBT bandwidth included in the uplink resource is LBT bandwidth indicated by LBT bandwidth indication bits in the valid bits in some LBT bandwidths of the target BWP, or an LBT bandwidth indicated by LBT bandwidth indication bits in the valid bits at an amplified granularity, or a predefined LBT bandwidth of the target BWP.

Optionally, the determining an uplink resource indicated by the allocation field includes:

determining, based on a configuration of the target BWP, the number of bits required by the field for frequency domain resource allocation in the DCI used to schedule transmission of the PUSCH on the target BWP; and determining, based on the number of required bits, the uplink resource indicated by the allocation field.

Optionally, if the number of bits of the first bits is greater than or equal to the number of required bits, and the number of bits of the valid bits is equal to the number of required bits; or if the number of bits of the first bits is less than the number of required bits, the uplink resource is the uplink resource indicated by the valid bits in some resources of the target BWP, or the uplink resource indicated by the valid bits at the scaled granularity, or the predefined uplink resource in the resources of the target BWP.

Optionally, in a case that the number of bits of the first bits is less than the number of required bits: if the first bits include interlace indication bits and/or LBT bandwidth indication bits, the number of interlace indication bits is less than or equal to the number of bits required by interlace indication bits in the number of required bits, and/or the number of LBT bandwidth indication bits is less than or equal to the number of bits required by LBT bandwidth indication bits in the number of required bits.

Optionally, if the number of interlace indication bits of the first bits is less than the number of bits required by the interlace indication bits in the number of required bits, the interlace included in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

Optionally, the interlace indication bits and/or the LBT bandwidth indication bits included in the valid bits are obtained by dividing all or a part of the first bits, where the first bits include interlace indication bits and/or LBT bandwidth indication bits.

Optionally, if the number of interlace indication bits of the first bits is greater than or equal to the number of bits required by interlace indication bits in the number of required bits, the interlace in the uplink resource is the interlace indicated by the interlace indication bits in the valid bits, where the number of bits of interlace indication bits in the valid bits is equal to the number of bits required by the interlace indication bits; or if the number of LBT bandwidth indication bits of the first bits is greater than or equal to the number of bits required by LBT bandwidth indication bits in the number of required bits, the LBT bandwidth in the uplink resource is the LBT bandwidth indicated by the LBT bandwidth indication bits in the valid bits, where the number of bits of LBT bandwidth indication bits in the valid bits is equal to the number of bits required by the LBT bandwidth indication bits; or if the number of interlace indication bits of the first bits is less than the number of bits required by the interlace indication bits in the number of required bits, the interlace in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

Optionally, both a frequency domain resource allocation type of the reference BWP and a frequency domain resource allocation type of the target BWP are an interlace resource allocation type; or a frequency domain resource allocation type of the reference BWP is an interlace resource allocation type, and a resource allocation type of the target BWP is a resource allocation type 0 or a resource allocation type 1; or a frequency domain resource allocation type of the reference BWP is a resource allocation type 0 or a resource allocation type 1, and a resource allocation type of the target BWP is an interlace resource allocation type.

Optionally, if the first DCI is received in a common search space CSS, the uplink resource is an uplink resource indicated by the valid bits in some resources of the target BWP, or a predefined resource of the target BWP; or if the first DCI is received in a UE-specific search space USS, the uplink resource is an uplink resource indicated by the valid bits at an amplified granularity, or a predefined resource of the target BWP.

Optionally, the first DCI is fallback DCI; or the first DCI is non-fallback DCI indicating switching of a BWP and scheduling transmission of the PUSCH on the target BWP after the switching.

The terminal can save energy of the terminal.

It should be understood that, in this embodiment of the present disclosure, the radio frequency unit 601 may be configured to receive and send information or a signal in a call process. Specifically, after receiving downlink data from a base station, the radio frequency unit 601 sends the downlink data to the processor 610 for processing. In addition, the radio frequency unit 601 sends uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may communicate with a network and another device through a wireless communication system.

The terminal provides wireless broadband Internet access for the user by using the network module 602, for example, helping the user to send and receive an e-mail, brows a web page, and access streaming media.

The audio output unit 603 may convert audio data received by the radio frequency unit 601 or the network module 602 or stored in the memory 609 into an audio signal and output the audio signal as a sound. In addition, the audio output unit 603 may further provide an audio output (for example, a call signal received voice, or a message received voice) related to a specific function implemented by the terminal 600. The audio output unit 603 includes a speaker, a buzzer, a telephone receiver, and the like.

The input unit 604 is configured to receive an audio signal or a video signal. The input unit 604 may include a graphics processing unit (GPU) 6041, a microphone 6042, and a graphics processor 6041. The graphics processing unit 6041 processes image data of a still image or a video that is obtained by an image capturing apparatus (for example, a camera) in a video capturing mode or an image capturing mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive a sound and can process such sound into audio data. Processed audio data may be converted, in a call mode, into a format that can be sent to a mobile communication base station by using the radio frequency unit 601 for output.

The terminal 600 further includes at least one type of sensor 605, such as a light sensor, a motion sensor, and another sensor. Specifically, the light sensor includes an ambient light sensor and a proximity sensor. The ambient light sensor may adjust luminance of the display panel 6061 based on brightness of ambient light. The proximity sensor may turn off the display panel 6061 and/or backlight when the terminal 600 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for a user. The display unit 606 may include a display panel 6061. The display panel 6061 may be configured in a form of a liquid crystal display (LCD), an organic light-emitting diode (OLED), or the like.

The user input unit 607 may be configured to receive input numeral or character information, and generate key signal input related to user setting and functional control of the terminal. Specifically, the user input unit 607 includes a touch panel 6071 and another input device 6072. The touch panel 6071 is also referred to as a touchscreen, and may collect a touch operation performed by a user on or near the touch panel 6071 (such as an operation performed by a user on or near the touch panel 6071 by using any proper object or accessory, such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 610, and receives and executes a command sent by the processor 610. In addition, the touch panel 6071 may be of a resistive type, a capacitive type, an infrared type, a surface acoustic wave type, or the like. The user input unit 607 may include another input device 6072 in addition to the touch panel 6071. Specifically, the another input device 6072 may include but is not limited to a physical keyboard, a functional button (such as a volume control button or a power on/off button), a trackball, a mouse, and a joystick. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. In FIG. 6, although the touch panel 6071 and the display panel 6061 are used as two independent parts to implement input and output functions of the terminal, in some embodiments, the touch panel 6071 and the display panel 6061 may be integrated to implement the input and output functions of the terminal. This is not specifically limited herein.

The interface unit 608 is an interface for connecting an external apparatus with the terminal 600. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 608 may be configured to receive input (for example, data information and power) from an external apparatus and transmit the received input to one or more elements in the terminal 600 or may be configured to transmit data between the terminal 600 and an external apparatus.

The memory 609 may be configured to store a software program and various data. The memory 609 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 609 may include a high-speed random access memory, and may further include a nonvolatile memory, for example, at least one magnetic disk storage device, a flash storage device, or another volatile solid-state storage device.

The processor 610 is a control center of the terminal, and connects all parts of the entire terminal by using various interfaces and lines. By running or executing a software program and/or a module stored in the memory 609 and invoking data stored in the memory 609, the processor 610 performs various functions of the terminal and data processing, to perform overall monitoring on the terminal. The processor 610 may include one or more processing units. Optionally, an application processor and a modem processor may be integrated into the processor 610. The application processor mainly processes an operating system, a user interface, an application program, and the like. The modem processor mainly processes wireless communications. It can be understood that, alternatively, the modem processor may not be integrated into the processor 610.

The terminal 600 may further include the power supply 611 (such as a battery) that supplies power to each component. Optionally, the power supply 611 may be logically connected to the processor 610 by using a power management system, so as to implement functions such as charging, discharging, and power consumption management by using the power management system.

In addition, the terminal 600 includes some function modules not shown, and details are not described herein.

Optionally, an embodiment of the present disclosure further provides a terminal, including a processor 610, a memory 609, and a computer program that is stored in the memory 609 and that can be run on the processor 610. When the computer program is executed by the processor 610, the processes of the foregoing uplink resource determining method embodiment are implemented and a same technical effect can be achieved. To avoid repetition, details are not described herein again.

Figure 7:
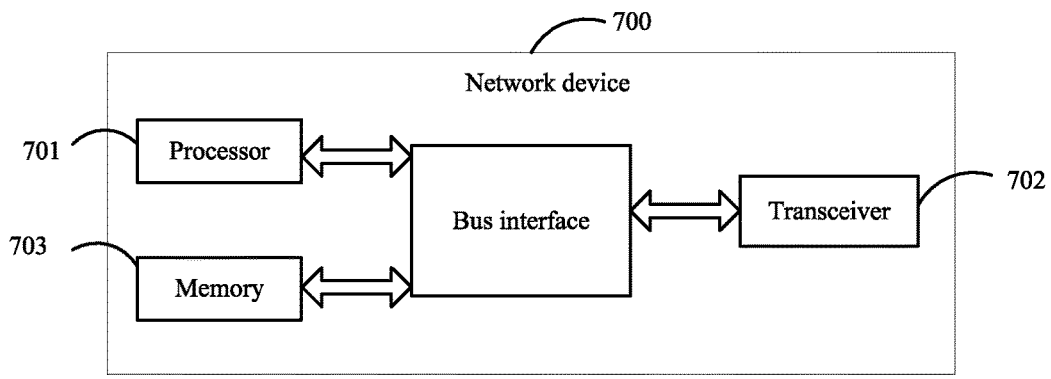
FIG. 7 is a structural diagram of another network device according to an embodiment of the present disclosure.

Referring to FIG. 7, FIG. 7 is a structural diagram of another network device according to an embodiment of the present disclosure. As shown in FIG. 7, a network device 700 includes a processor 701, a transceiver 702, a memory 703, and a bus interface.

The transceiver 702 is configured to send first downlink control information DCI used to schedule transmission of a physical uplink shared channel PUSCH on a target bandwidth part BWP, where the first DCI includes an allocation field for frequency domain resource allocation, the allocation field is determined based on a configuration of a reference BWP, and the allocation field includes first bits; and the allocation field indicates that an uplink resource is indicated by using valid bits of the first bits; and a resource allocation type of at least one of the reference BWP and the target BWP is interlace resource allocation.

Optionally, the uplink resource includes:

an uplink resource indicated by the valid bits in some resources of the target BWP; or an uplink resource indicated by the valid bits at a scaled granularity; or a predefined uplink resource in resources of the target BWP.

Optionally, the valid bits are all or a part of the first bits; or the valid bits are M pieces of bit content obtained by dividing all or a part of the first bits, where the M pieces of bit content are M resource indications, and M is an integer greater than or equal to 1.

Optionally, the number of bits of the first bits is the number of bits obtained by performing bit truncation on bits of the allocation field determined based on the configuration of the reference BWP during DCI size alignment.

Optionally, the number of bits obtained by performing bit truncation on the bits of the allocation field determined based on the configuration of the reference BWP during DCI size alignment includes:

the number of bits obtained by performing bit truncation on interlace indication bits of the allocation field determined based on the configuration of the reference BWP; or the number of bits obtained by performing bit truncation on listen before talk LBT bandwidth indication bits of the allocation field determined based on the configuration of the reference BWP; or the number of bits obtained by performing bit truncation on interlace indication bits and LBT bandwidth indication bits of the allocation field determined based on the configuration of the reference BWP.

Optionally, if bit truncation is performed on the interlace indication bits, interlace included in the uplink resource is interlace indicated by interlace indication bits in the valid bits in some interlace of the target BWP, or interlace indicated by interlace indication bits in the valid bits at an amplified granularity; or if bit truncation is performed on the LBT bandwidth indication bits, an LBT bandwidth included in the uplink resource is LBT bandwidth indicated by LBT bandwidth indication bits in the valid bits in some LBT bandwidths of the target BWP, or an LBT bandwidth indicated by LBT bandwidth indication bits in the valid bits at an amplified granularity, or a predefined LBT bandwidth of the target BWP.

Optionally, the uplink resource includes an uplink resource that is indicated by the valid bits and that is determined based on the number of required bits, where the number of required bits is the number that is of bits required by the field for frequency domain resource allocation in the DCI used to schedule transmission of the PUSCH on the target BWP and that is determined based on a configuration of the target BWP.

Optionally, if the number of bits of the first bits is greater than or equal to the number of required bits, and the number of bits of the valid bits is equal to the number of required bits; or if the number of bits of the first bits is less than the number of required bits, the uplink resource is the uplink resource indicated by the valid bits in some resources of the target BWP, or the uplink resource indicated by the valid bits at the scaled granularity, or the predefined uplink resource in the resources of the target BWP.

Optionally, in a case that the number of bits of the first bits is less than the number of required bits:

if the first bits include interlace indication bits and/or LBT bandwidth indication bits, the number of interlace indication bits is less than or equal to the number of bits required by interlace indication bits in the number of required bits, and/or the number of LBT bandwidth indication bits is less than or equal to the number of bits required by LBT bandwidth indication bits in the number of required bits.

Optionally, if the number of interlace indication bits of the first bits is less than the number of bits required by the interlace indication bits in the number of required bits, the interlace included in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

Optionally, the interlace indication bits and/or the LBT bandwidth indication bits included in the valid bits are obtained by dividing all or a part of the first bits, where the first bits include interlace indication bits and/or LBT bandwidth indication bits.

Optionally, if the number of interlace indication bits of the first bits is greater than or equal to the number of bits required by interlace indication bits in the number of required bits, the interlace in the uplink resource is the interlace indicated by the interlace indication bits in the valid bits, where the number of bits of interlace indication bits in the valid bits is equal to the number of bits required by the interlace indication bits; or if the number of LBT bandwidth indication bits of the first bits is greater than or equal to the number of bits required by LBT bandwidth indication bits in the number of required bits, the LBT bandwidth in the uplink resource is the LBT bandwidth indicated by the LBT bandwidth indication bits in the valid bits, where the number of bits of LBT bandwidth indication bits in the valid bits is equal to the number of bits required by the LBT bandwidth indication bits; or if the number of interlace indication bits of the first bits is less than the number of bits required by the interlace indication bits in the number of required bits, the interlace in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth included in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

Optionally, both a frequency domain resource allocation type of the reference BWP and a frequency domain resource allocation type of the target BWP are an interlace resource allocation type; or a frequency domain resource allocation type of the reference BWP is an interlace resource allocation type, and a resource allocation type of the target BWP is a resource allocation type 0 or a resource allocation type 1; or a frequency domain resource allocation type of the reference BWP is a resource allocation type 0 or a resource allocation type 1, and a resource allocation type of the target BWP is an interlace resource allocation type.

Optionally, if the first DCI is received in a common search space CSS, the uplink resource is an uplink resource indicated by the valid bits in some resources of the target BWP, or a predefined resource of the target BWP; or if the first DCI is received in a UE-specific search space USS, the uplink resource is an uplink resource indicated by the valid bits at an amplified granularity, or a predefined resource of the target BWP.

Optionally, the first DCI is fallback DCI; or the first DCI is non-fallback DCI indicating switching of a BWP and scheduling transmission of the PUSCH on the target BWP after the switching.

The network device can improve transmission performance of a terminal.

The transceiver 702 is configured to receive and send data under the control of the processor 701. The transceiver 702 includes at least two antenna ports.

In FIG. 7, a bus architecture may include any quantity of interconnected buses and bridges. Specifically, various circuits of one or more processors represented by the processor 701 and a memory represented by the memory 703 are interconnected. The bus architecture may further link various other circuits such as a peripheral device, a voltage regulator, and a power management circuit. These are well known in the art, and therefore are not further described in this specification. A bus interface provides an interface. The transceiver 702 may be a plurality of components. To be specific, the transceiver 702 includes a transmitter and a receiver, and provides a unit configured to communicate with various other apparatuses on a transmission medium. For different user equipment, a user interface 704 may be an interface that can externally or internally connect to a needed device, and the connected device includes but is not limited to a keypad, a display, a loudspeaker, a microphone, and a joystick.

The processor 701 is responsible for bus architecture management and general processing. The memory 703 may store data used by the processor 701 when the processor 701 performs an operation.

Optionally, an embodiment of the present disclosure further provides a network device, including a processor 701, a memory 703, and a computer program that is stored in the memory 703 and that can be run on the processor 701. When the computer program is executed by the processor 701, the processes of the foregoing uplink resource indication method embodiment are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the uplink resource determining method provided in the embodiments of the present disclosure is implemented, or when the computer program is executed by a processor, the uplink resource indicating method provided in the embodiments of the present disclosure is implemented, and a same technical effect can be achieved. To avoid repetition, details are not described herein again. The computer-readable storage medium includes a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. An uplink resource determining method, applied to a terminal and comprising:
receiving first downlink control information DCI used to
schedule transmission of a physical uplink shared channel PUSCH on a target bandwidth part BWP, wherein the first DCI comprises an allocation field for frequency domain resource allocation, the allocation field is determined based on a configuration of a reference BWP, and the allocation field comprises first bits; and determining an uplink resource indicated by the allocation field, wherein the uplink resource is an uplink resource determined based on valid bits of the first bits; and a resource allocation type of at least one of the reference BWP and the target BWP is interlace resource allocation.

2. The method according to claim 1, wherein the valid bits are all or a part of the first bits; or the valid bits are M pieces of bit content obtained by dividing all or a part of the first bits, wherein the M pieces of bit content are M resource indications, and M is an integer greater than or equal to 1.

3. The method according to claim 1, wherein the determining an uplink resource indicated by the allocation field comprises:

determining, based on a configuration of the target BWP, the number of bits required by the field for frequency domain resource allocation in the DCI used to schedule transmission of the PUSCH on the target BWP; and determining, based on the number of required bits, the uplink resource indicated by the allocation field.

4. The method according to claim 3, wherein if the number of bits of the first bits is greater than or equal to the number of required bits, and the number of bits of the valid bits is equal to the number of required bits; or if the number of bits of the first bits is less than the number of required bits, the uplink resource is the uplink resource indicated by the valid bits in some resources of the target BWP, or the uplink resource indicated by the valid bits at the scaled granularity, or the predefined uplink resource in the resources of the target BWP.

5. The method according to claim 4, wherein in a case that the number of bits of the first bits is less than the number of required bits:

if the first bits comprise interlace indication bits and/or LBT bandwidth indication bits, the number of interlace indication bits is less than or equal to the number of bits required by interlace indication bits in the number of required bits, and/or the number of LBT bandwidth indication bits is less than or equal to the number of bits required by LBT bandwidth indication bits in the number of required bits.

6. The method according to claim 5, wherein if the number of interlace indication bits of the first bits is less than the number of bits required by the interlace indication bits in the number of required bits, the interlace comprised in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth comprised in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

7. The method according to claim 3, wherein if the number of interlace indication bits of the first bits is greater than or equal to the number of bits required by interlace indication bits in the number of required bits, the interlace in the uplink resource is the interlace indicated by the interlace indication bits in the valid bits, wherein the number of bits of interlace indication bits in the valid bits is equal to the number of bits required by the interlace indication bits; or if the number of LBT bandwidth indication bits of the first bits is greater than or equal to the number of bits required by LBT bandwidth indication bits in the number of required bits, the LBT bandwidth in the uplink resource is the LBT bandwidth indicated by the LBT bandwidth indication bits in the valid bits, wherein the number of bits of LBT bandwidth indication bits in the valid bits is equal to the number of bits required by the LBT bandwidth indication bits; or if the number of interlace indication bits of the first bits is less than the number of bits required by the interlace indication bits in the number of required bits, the interlace in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth comprised in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

8. The method according to claim 3, wherein both a frequency domain resource allocation type of the reference BWP and a frequency domain resource allocation type of the target BWP are an interlace resource allocation type; or a frequency domain resource allocation type of the reference BWP is an interlace resource allocation type, and a resource allocation type of the target BWP is a resource allocation type 0 or a resource allocation type 1; or a frequency domain resource allocation type of the reference BWP is a resource allocation type 0 or a resource allocation type 1, and a resource allocation type of the target BWP is an interlace resource allocation type.

9. A terminal, comprising a memory, a processor, and a program that is stored in the memory and that can be run on the processor, wherein when the program is executed by the processor, the steps of the uplink resource determining method are implemented, wherein the method comprises:

receiving first downlink control information DCI used to schedule transmission of a physical uplink shared channel PUSCH on a target bandwidth part BWP, wherein the first DCI comprises an allocation field for frequency domain resource allocation, the allocation field is determined based on a configuration of a reference BWP, and the allocation field comprises first bits; and determining an uplink resource indicated by the allocation field, wherein the uplink resource is an uplink resource determined based on valid bits of the first bits; and a resource allocation type of at least one of the reference BWP and the target BWP is interlace resource allocation.

10. The terminal according to claim 9, wherein the determining an uplink resource indicated by the allocation field comprises:
determining, based on a configuration of the target BWP, the number of bits required by the field for frequency domain resource allocation in the DCI used to schedule transmission of the PUSCH on the target BWP; and
determining, based on the number of required bits, the uplink resource indicated by the allocation field.

11. The terminal according to claim 10, wherein if the number of bits of the first bits is greater than or equal to the number of required bits, and the number of bits of the valid bits is equal to the number of required bits; or
if the number of bits of the first bits is less than the number of required bits, the uplink resource is the uplink resource indicated by the valid bits in some resources of the target BWP, or the uplink resource indicated by the valid bits at the scaled granularity, or the predefined uplink resource in the resources of the target BWP.

12. The terminal according to claim 11, wherein in a case that the number of bits of the first bits is less than the number of required bits:
if the first bits comprise interlace indication bits and/or LBT bandwidth indication bits, the number of interlace indication bits is less than or equal to the number of bits required by interlace indication bits in the number of required bits, and/or the number of LBT bandwidth indication bits is less than or equal to the number of bits required by LBT bandwidth indication bits in the number of required bits.

13. The terminal according to claim 12, wherein if the number of interlace indication bits of the first bits is less than the number of bits required by the interlace indication bits in the number of required bits, the interlace comprised in the uplink resources is the interlace is the interlace indicated by the interlace indication bits in the valid bits in some interlace of the target BWP, or the interlace indicated by the interlace indication bits in the valid bits at the amplified granularity; or
if the number of LBT bandwidth indication bits of the first bits is less than the number of bits required by the LBT bandwidth indication bits in the number of required bits, the LBT bandwidth comprised in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

14. The terminal according to claim 11, wherein if the number of interlace indication bits of the first bits is greater than or equal to the number of bits required by interlace indication bits in the number of required bits, the interlace in the uplink resource is the interlace indicated by the interlace indication bits in the valid bits, wherein the number of bits of interlace indication bits in the valid bits is equal to the number of bits required by the interlace indication bits; or
if the number of LBT bandwidth indication bits of the first bits is greater than or equal to the number of bits required by LBT bandwidth indication bits in the number of required bits, the LBT bandwidth in the uplink resource is the LBT bandwidth indicated by the LBT bandwidth indication bits in the valid bits, wherein the number of bits of LBT bandwidth indication bits in the valid bits is equal to the number of bits required by the LBT bandwidth indication bits; or
if the number of interlace indication bits of the first bits is less than the number of bits required by the interlace indication bits in the number of required bits, the interlace in the uplink resources is the interlace is the interlace indicated by the interlace indication bits in the valid bits in some interlace of the target BWP, or the interlace indicated by the interlace indication bits in the valid bits at the amplified granularity; or
if the number of LBT bandwidth indication bits of the first bits is less than the number of bits required by the LBT bandwidth indication bits in the number of required bits, the LBT bandwidth comprised in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

15. The terminal according to claim 11, wherein both a frequency domain resource allocation type of the reference BWP and a frequency domain resource allocation type of the target BWP are an interlace resource allocation type; or
a frequency domain resource allocation type of the reference BWP is an interlace resource allocation type, and a resource allocation type of the target BWP is a resource allocation type 0 or a resource allocation type 1; or
a frequency domain resource allocation type of the reference BWP is a resource allocation type 0 or a resource allocation type 1, and a resource allocation type of the target BWP is an interlace resource allocation type.

16. A network device, comprising a memory, a processor, and a program that is stored in the memory and that can be run on the processor, wherein when the program is executed by the processor, the steps of the uplink resource indication method are implemented, wherein the method comprises:
sending first downlink control information DCI used to schedule transmission of a physical uplink shared channel PUSCH on a target bandwidth part BWP, wherein the first DCI comprises an allocation field for frequency domain resource allocation, the allocation field is determined based on a configuration of a reference BWP, and the allocation field comprises first bits; and
the allocation field indicates that an uplink resource is indicated by using valid bits of the first bits; and
a resource allocation type of at least one of the reference BWP and the target BWP is interlace resource allocation.

17. The network device according to claim 16, wherein the uplink resource comprises an uplink resource that is indicated by the valid bits and that is determined based on the number of required bits, wherein the number of required bits is the number that is of bits required by the field for frequency domain resource allocation in the DCI used to schedule transmission of the PUSCH on the target BWP and that is determined based on a configuration of the target BWP.

18. The network device according to claim 17, wherein if the number of bits of the first bits is greater than or equal to the number of required bits, and the number of bits of the valid bits is equal to the number of required bits; or
if the number of bits of the first bits is less than the number of required bits, the uplink resource is the uplink resource indicated by the valid bits in some resources of the target BWP, or the uplink resource indicated by the valid bits at the scaled granularity, or the predefined uplink resource in the resources of the target BWP.

19. The network device according to claim 18, wherein in a case that the number of bits of the first bits is less than the number of required bits:

if the first bits comprise interlace indication bits and/or LBT bandwidth indication bits, the number of interlace indication bits is less than or equal to the number of bits required by interlace indication bits in the number of required bits, and/or the number of LBT bandwidth indication bits is less than or equal to the number of bits required by LBT bandwidth indication bits in the number of required bits.

20. The network device according to claim 19, wherein if the number of interlace indication bits of the first bits is less than the number of bits required by the interlace indication bits in the number of required bits, the interlace comprised in the uplink resources is the interlace is the interlace indicated by the interlace indication bits in the valid bits in some interlace of the target BWP, or the interlace indicated by the interlace indication bits in the valid bits at the amplified granularity; or if the number of LBT bandwidth indication bits of the first bits is less than the number of bits required by the LBT bandwidth indication bits in the number of required bits, the LBT bandwidth comprised in the uplink resource is the LBT bandwidth indicated by the LBT bandwidth indication bits in the valid bits in some LBT bandwidths of the target BWP, or the LBT bandwidth indicated by the LBT bandwidth indication bits in the valid bits at the amplified granularity, or the predefined LBT bandwidth of the target BWP.

* * * * *